US00RE42808E

(19) United States
(12) Reissued Patent
Tedesco

(10) Patent Number: US RE42,808 E
(45) Date of Reissued Patent: Oct. 4, 2011

(54) METHOD, SYSTEM AND APPARATUS FOR SEPARATELY PROCESSING DATABASE QUERIES

(75) Inventor: Michael A. Tedesco, Monroe, CT (US)

(73) Assignee: Harrison Agate, LLC, Las Vegas, NV (US)

(21) Appl. No.: 12/315,061

(22) Filed: Nov. 26, 2008

Related U.S. Patent Documents

Reissue of:
(64) Patent No.: 7,143,080
Issued: Nov. 28, 2006
Appl. No.: 10/032,770
PCT Filed: Dec. 27, 2001

(51) Int. Cl.
*G06F 17/30* (2006.01)

(52) U.S. Cl. ..... 707/758; 707/770

(58) Field of Classification Search ..... 707/1–3, 707/10; 718/105–106
See application file for complete search history.

(56) References Cited

U.S. PATENT DOCUMENTS

| | | | | |
|---|---|---|---|---|
| 6,032,143 | A * | 2/2000 | Leung et al. | 707/2 |
| 6,128,279 | A | 10/2000 | O'Neill et al. | |
| 6,151,601 | A | 11/2000 | Papierniak et al. | |
| 6,226,649 | B1 * | 5/2001 | Bodamer et al. | 707/104.1 |
| 6,438,741 | B1 * | 8/2002 | Al-omari et al. | 707/2 |
| 6,567,806 | B1 | 5/2003 | Tsuchida et al. | |
| 6,820,073 | B1 | 11/2004 | Bedell et al. | |
| 6,886,035 | B2 | 4/2005 | Wolff | |
| 2002/0116457 | A1 | 8/2002 | Eshleman et al. | |
| 2002/0184219 | A1 | 12/2002 | Preisig et al. | |
| 2003/0065648 | A1 | 4/2003 | Driesch, Jr. et al. | |
| 2003/0101238 | A1 | 5/2003 | Davison | |
| 2003/0182276 | A1 | 9/2003 | Bossman et al. | |
| 2005/0114352 | A1 | 5/2005 | Ronneburg et al. | |

OTHER PUBLICATIONS

Hongjun Lu and Kian-Lee Tan, Dynamic and Load-Balanced Task-Oriented Database Query Processing in Parallel Systems, Dept. of Information Systems and Computer Science, National University of Singapore, ACM, 1992, pp. 357-372.

* cited by examiner

*Primary Examiner* — Debbie M Le
(74) *Attorney, Agent, or Firm* — McDonnell Boehnen Hulbert & Berghoff LLP

(57) ABSTRACT

A computing system provides database access to a plurality of users, for example, over a computer network such as the Internet. The computing system includes an established database engine and accompanying database files containing data that the users may query. The computing system further includes an alternate database engine that may intercept and execute such database commands submitted by the users. The alternate database engine may translate and recognize commands submitted in the format of the established database engine. The alternate database engine may further provide results in the format of the established database engine. In this manner, an alternate database engine can be implemented to provide further or more efficient processing capabilities. At the same time, users may continue to interact with the data maintained by the established database engine in a manner with which they are familiar, and data providers may switch to the alternate database engine without reformatting the data stored in the established database engine.

75 Claims, 19 Drawing Sheets

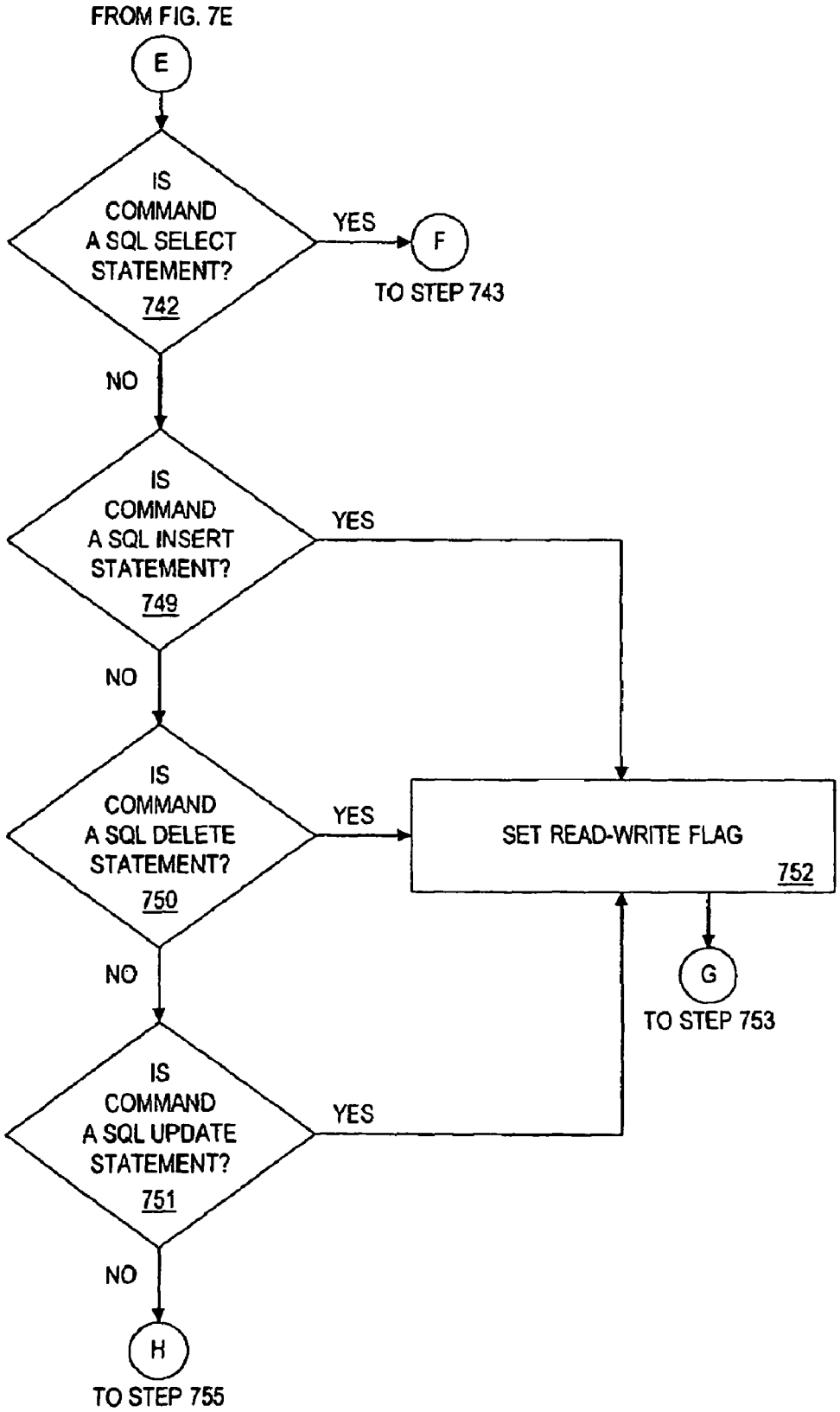
FIG. 7F1

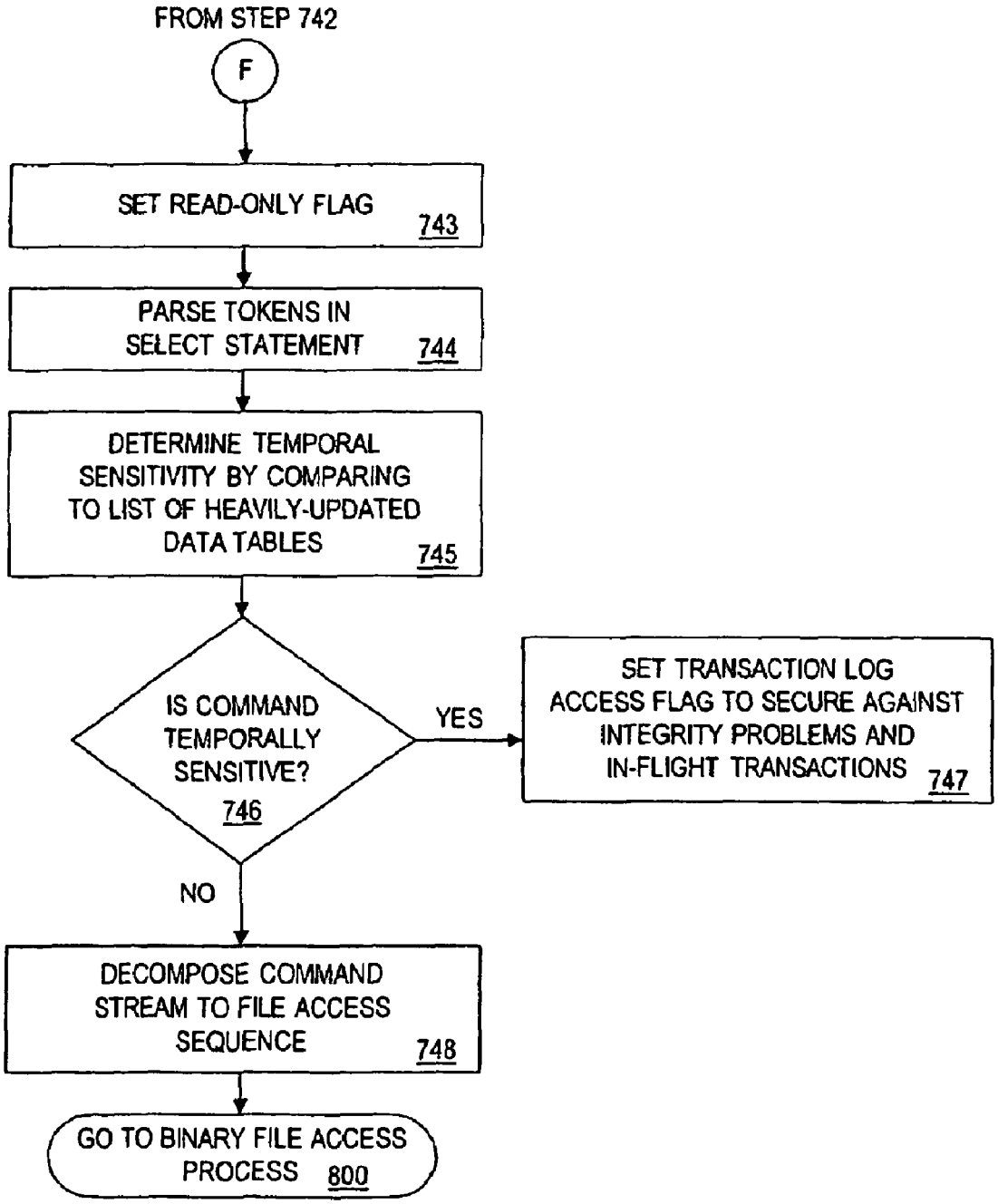
FIG. 7F2

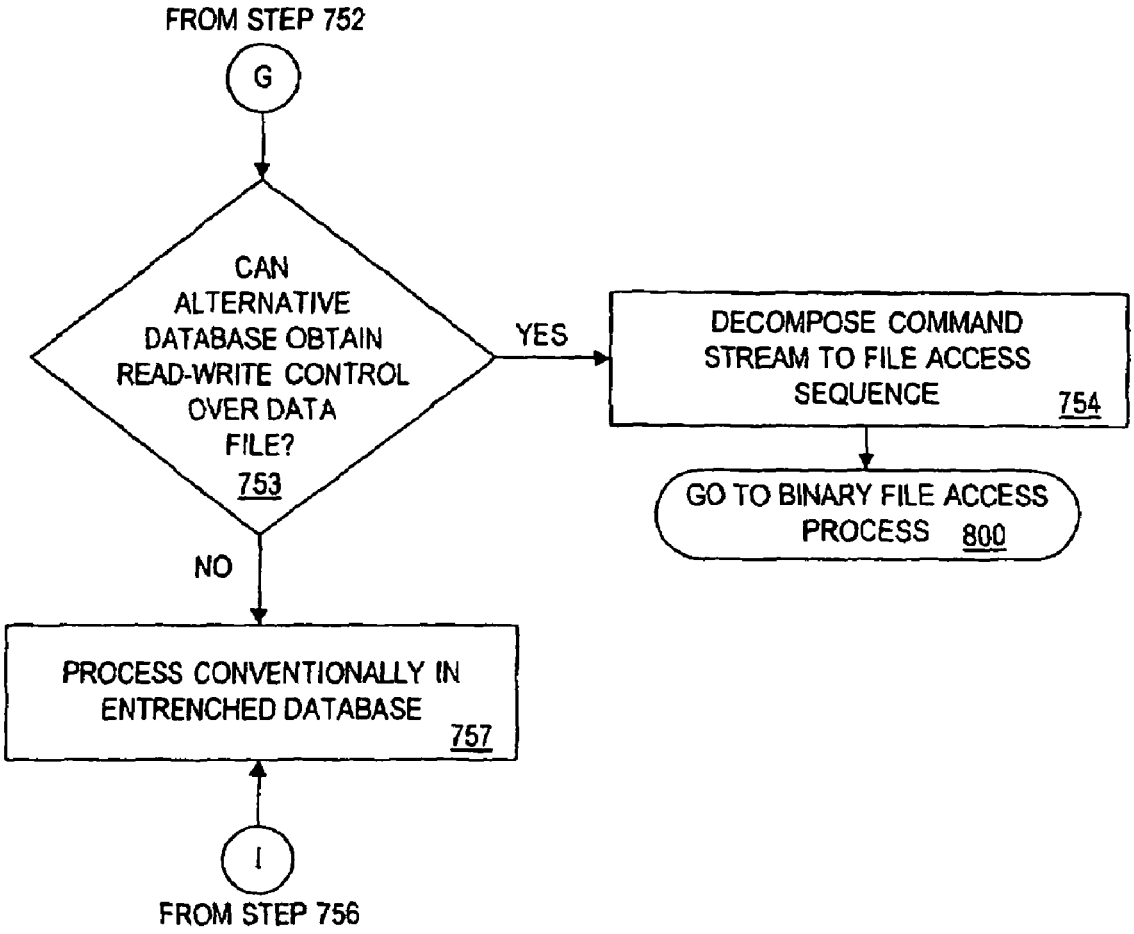
FIG. 7F3

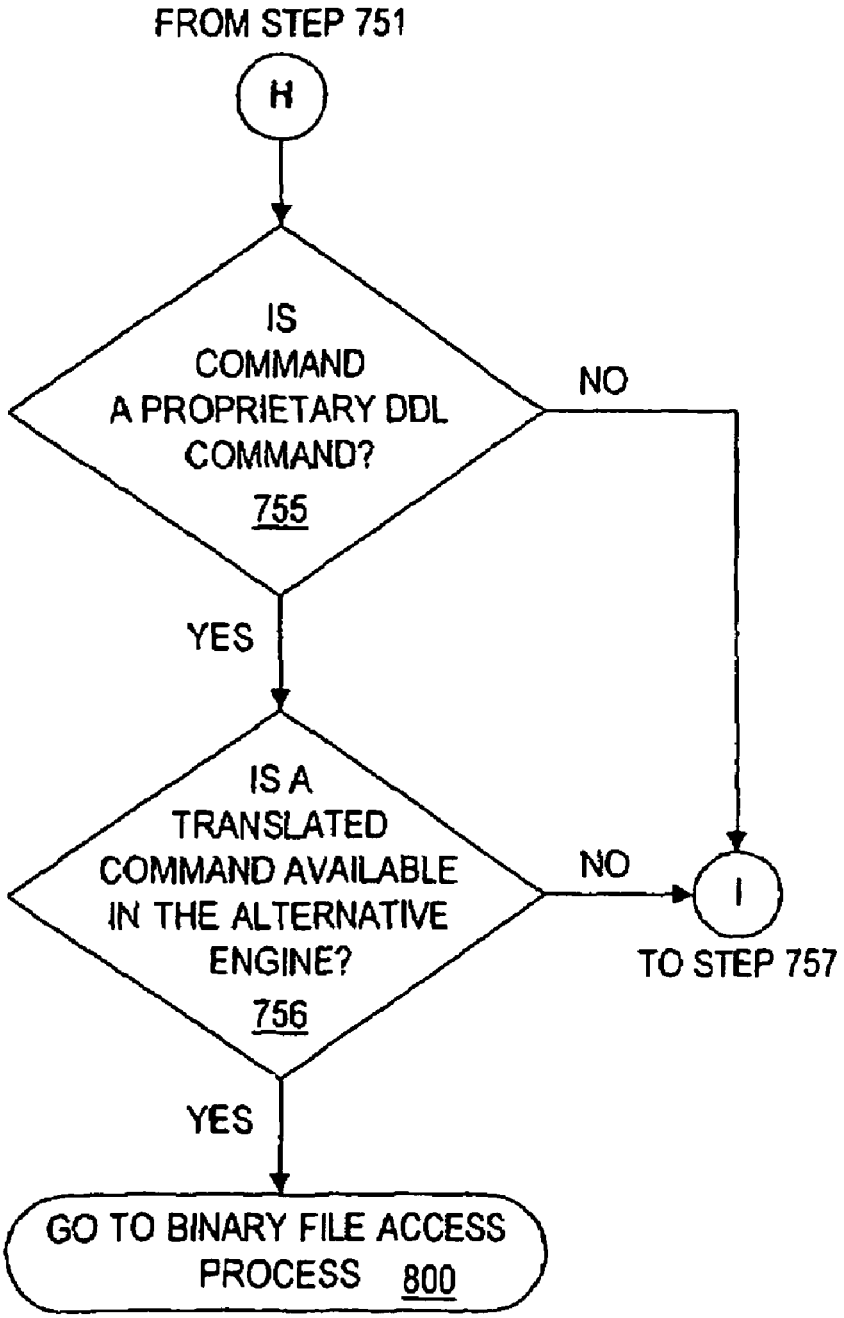
FIG. 7F4

METHOD, SYSTEM AND APPARATUS FOR SEPARATELY PROCESSING DATABASE QUERIES

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to U.S. patent application Ser. No. 10/034,885 entitled "METHOD AND APPARATUS FOR SCREENING DATABASE QUERIES PRIOR TO SUBMISSION TO A DATABASE" filed on Dec. 26, 2001 in the name of Michael Tedesco, the entirety of which is incorporated herein by reference.

FIELD OF THE INVENTION

The present invention relates generally to database management and, more particularly, to methods and apparatuses for accessing data from an established database using an alternate database engine.

BACKGROUND OF THE INVENTION

Businesses typically employ enterprise-wide database engines in order to allow employees, customers, and other such users, to access data stored in one or more data files maintained thereby. Users typically access a database engine over a computer network in which a user's computing terminal may communicate with one or more servers maintaining the database engine. Examples of such database engines include those supporting Structured Query Language (SQL) formats, Open-Database Connectivity (ODBC) and Javascript Database Connectivity (JDBC) protocols produced by MICROSOFT, ORACLE, SYBASE, SUN MICROSYSTEMS and the like.

Businesses employing such database engines typically find that it is difficult to convert to or incorporate an alternate database engine that is produced by another database manufacturer or that employs a differing data format. This problem, known as entrenchment, arises due to costs that arise from conversion between competing database products. These costs are due largely to the nature of existing computer software, in that differing data standards, command structures, and file formats are typically used by competing database manufacturers. For example, conversion of any data stored by an established database engine to a format supported by the new database engine may be labor-intensive, and therefore, expensive. In addition, new data commands corresponding to the new database engine must be learned by users in order to interact efficiently with them. The process of learning new commands temporarily reduces the user's efficiency, thereby impacting his or her efficiency. Businesses then may determine that the costs associated with conversion would prevent them from selecting a new database engine, if when it would provide new or more desirable functionality.

A business or other entity is thus largely wedded to a particular established database system once it has been selected and implemented. Over time, entrenchment may result in additional unwanted costs. For example, a database manufacturer may require its customers to purchase software upgrades periodically, in order to maintain service contracts and the like for the established database engine, even when such upgrades do not provide any additional functionality that is specifically beneficial to the business.

In another example, a business may wish to expand database services to users by providing additional database servers on the computer network, particularly where large amounts of data are maintained or large numbers of users are provided with access. In such a case, the business would be forced to purchase another license for the established database engine to run on a new server, even when less costly database engines may be available.

Various solutions to the entrenchment problem have been attempted. A first example involves certain database engines that periodically copy or replicate data stored by an established database engine and provide it to further users. However, this solution is not ideal in the case of temporally-sensitive data that changes on a continuing basis, such as a historical stock price data. There is inherently some delay associated between conversion of the data between the established and the new database engines. Also, there is a delay associated with data transfer between the two database engines. This may result in inaccurate result sets being generated and returned to users accessing such database engines.

A second example is a class of software products known as middleware applications, such as ODBC produced by MICROSOFT, and JDBC by SUN MICROSYSTEMS. In such applications, the network connectivity layers of the middleware and the established database system are still tied together. Thus, database commands submitted to the middleware application must be processed by a command software layer of the established database system. In a case where the new database engine is implemented to relieve some of the processing performed by the established database engine, system usage resources and other costs, including financial costs, associated with the established database engine are still negatively-impacted.

A final example is a class of software products commonly known as database gateway products. These products provide a command gateway between competing database engines of differing data formats, allowing users to submit one command to interact with two or more such separate, supported, database engines. Examples of such gateway products include TRANSPARENT GATEWAY by ORACLE, MICROKERNEL by PERVASIVE, OMNISQL by SYBASE, STARNET and STARGATE produced by POWERHOUSE and DB INTEGRATOR by DIGITAL EQUIPMENT CORPORATION. However, these gateway products generally require continuous maintenance and customization. For example, data mapping in a metadata mapping layer must be continuously changed with every change to the separate supported database engines. Furthermore, the command layer of each separate database engine is accessed by such gateway products in order to process database commands, thus impacting system resources of each server that maintains a database engine. Again, the desired purpose of having a separate database engine may be to relieve some processing from an established database engine. In such a case, this final example is not an optimal solution since system resources of both database engines are impacted.

Accordingly, there is a need for a method and apparatus for implementing and using an alternate database engine with an existing database engine that addresses certain problems of existing technologies.

SUMMARY OF THE INVENTION

The present application is directed to particular features of a system for implementing and using an alternate database engine with an existing database engine in which queries directed to an existing database are intercepted and executed by an alternate database engine.

According to a first embodiment, a method for processing a database command commences when a database command is received from a user that requires data from an established database engine. The established database engine has a command layer for processing database commands. However, in order to preserve system resources and the like of the established database server, the database command may be processed by accessing data from the established database engine using only a command layer of an alternate database engine without accessing the command layer of the established database engine.

In a second embodiment, a method for implementing and using an alternate database engine in conjunction with an established database engine commences when a plurality of users are given access to an established database engine that has a command layer for processing database commands. An alternate database engine is then established on the same computing system. A database command is received from one of the plurality of users, where the database command is directed to data stored by the established database engine. The command is processed using only the alternate database engine without accessing the command layer of the first database engine. In addition, the alternate database engine may maintain a second database file including second data which is accessible to the user and queried through the command layer of the alternate database engine as well.

The computing system is contemplated in various embodiments to include one or more of a local area network, a wide area network, an intranet, an extranet, a wireless network and the Internet.

The submitted database command may compatible with any known data format or protocol, such as a Structured Query Language format, a Javascript Database Connectivity protocol and an Open-Database Connectivity protocol.

In further embodiments, the command may be evaluated to determine its impact on available system resources or to determine whether the query can be optimized.

In additional embodiments, the alternate database engine determines whether the command requires accessing the temporally sensitive data of the established database engine, and if so, accesses a transaction log of the first database engine without interacting with the command layer of the established database engine.

Results of the query obtained by the alternate database engine may be provided to the user in a format associated with the established database engine.

The methods and apparatuses of the present invention may be used with enterprise database systems, or any other scale database system.

BRIEF DESCRIPTION OF THE DRAWINGS

Further aspects of the present invention will be more readily appreciated upon review of the detailed description of the various embodiments provided below when taken in conjunction with the accompanying drawings, of which:

FIGS. 7A-7F3 are a flowchart depicting an exemplary general process for implementing an alternate database engine according to certain embodiments of the present invention.

DETAILED DESCRIPTION OF THE INVENTION

Figure 1:
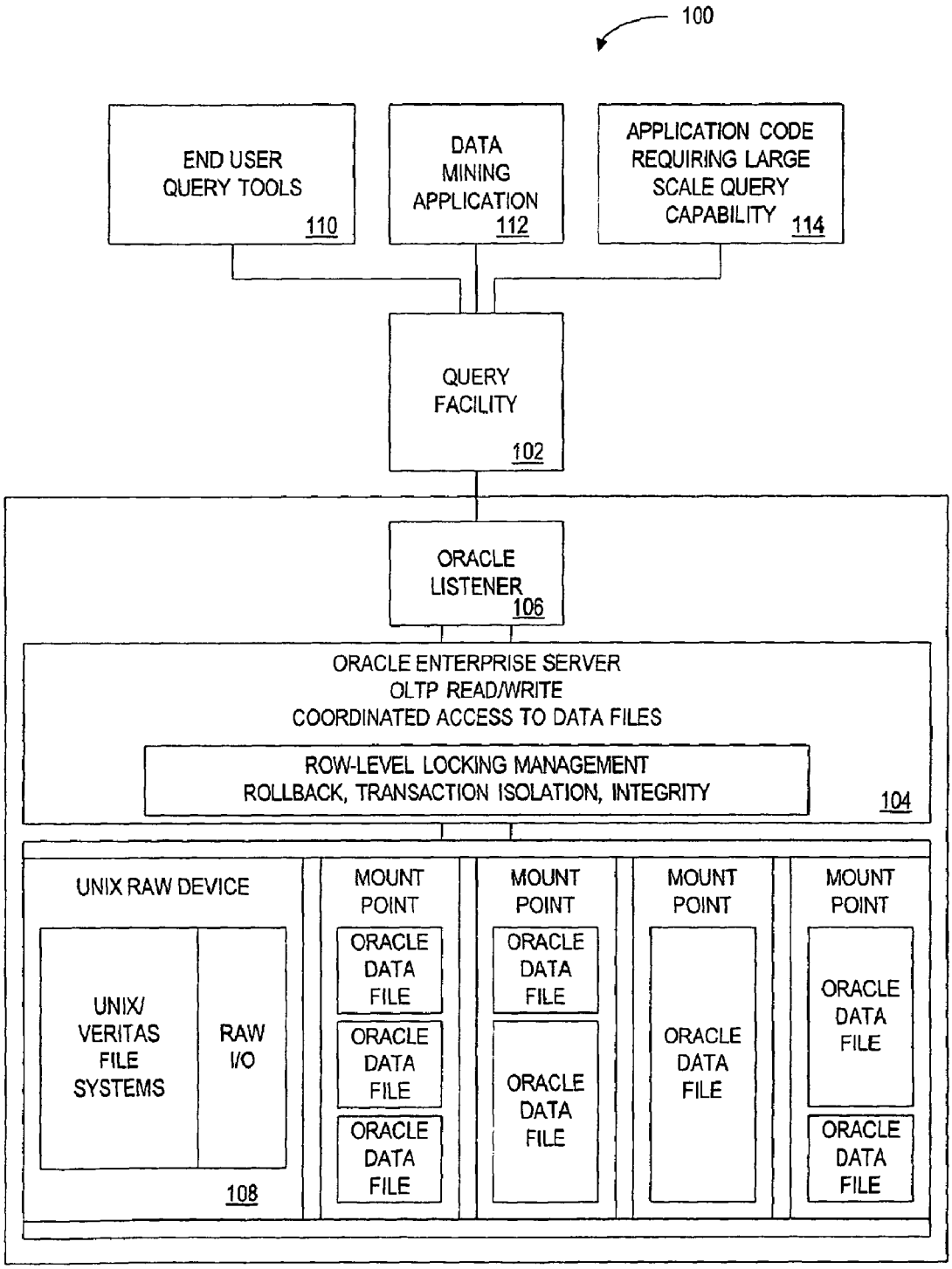
FIG. 1 is a diagram of a first exemplary network for implementing the alternate database engine of the present invention.

Various embodiments of the present invention involve a computer network having one or more servers that maintain an established database engine and an alternate database engine. The established database engine maintains legacy data that is accessible by a plurality of users having user terminals on the network. The alternate database engine may maintain further data that is stored after the alternate database engine is incorporated into the system. In some embodiments, the established database engine may also store some or all such further data.

Various database commands, that may require result data from the established database engine, may be selectively intercepted, evaluated, optimized and processed by the alternate database engine. The alternate database engine may translate the query, when necessary, to a recognizable format and process the same directly with the database file maintained by the established database engine, without interacting with the command layer of the established database engine. In such manner, the system resources of the server maintaining the established database engine are not overly impacted. Furthermore, the database commands may be submitted to the alternate database engine in the format of the established database engine, which in turn translates such commands to a native format, thereby allowing users to operate in a command environment with which they are already familiar.

A database command may be evaluated by the alternate database engine to determine system resources that will be impacted by a database command. For example, in a case where the database command is a query, the parameters of the query may be compared to historical or estimated performance data related to similar queries in order to estimate the impact on system usage. Particular parameters used for such evaluation are provided in exemplary fashion further below.

In a particular example, it may be desired to selectively intercept queries and process them through an available alternate database engine, rather than an overly-impacted established database engine. Where a database command is found to be read-intensive, write-intensive, or read-write-intensive, the database command may be intercepted and processed by an alternate database engine having available system resources. Other, less-intensive database commands may be passed to the established database engine when desired.

The database command may be further evaluated by the alternate database engine to determine whether temporally-sensitive data is requested from an established database engine. If so, the alternate database engine may access transaction logs of the established database engine to determine whether further data responsive to a database command has been submitted to the first database engine. Access of the transaction log may be performed without interacting with the command layer of the established database engine. Certain data from the transaction log may then be provided to the user in response to the database command, thereby ensuring accuracy of such generated results.

The alternate database engine of the present invention is contemplated to be fully compatible with, and may incorporate, the query optimization systems described in the applicant's co-pending U.S. patent application Ser. No. 10/034,885 entitled "METHOD AND APPARATUS FOR SCREENING DATABASE QUERIES PRIOR TO SUBMISSION TO A DATABASE" filed on Dec. 26, 2001, the entirety of which is incorporated herein by reference. The query optimization may be used in conjunction with the processes 700 and 800 described below with respect to FIGS. 7A-8C, in a manner readily apparent to one of ordinary skill in the art. Particular aspects and functionalities of these query optimization systems are described with respect to FIGS. 3 and 4 below.

Referring now to FIGS. 1-8C, wherein similar components of the present invention are referenced in like manner, preferred embodiments of a method and apparatus for implementing and using an alternate database engine with an existing database engine are disclosed.

Turning now to FIG. 1, there is depicted a first exemplary computer network 100 by which a plurality of users operating, for example, user terminal(s) 110, data mining applications 112 and large-scale query systems 114 may communicate with one or more established database servers 104 that maintain established database engines. Such communications may be intercepted an processed by an alternate database server 102 maintaining an alternate database engine.

Computer network 100 may be an Internet-based network such as the World Wide Web, a local area network (LAN), a wide-area network (WAN), an intranet environment, an extranet environment, a fiber optic network, or any other type of wired, wireless, or hybrid computer networks.

User terminals 110-114 may each be any type of computing device, such as a personal computer, a workstation, a network terminal, a hand-held remote access device, a personal digital assistant (PDA) or any other device that can accomplish two-way electronic communication over the network 100. Users may run a web browser or the like on user terminal 110-114 to communicate with the server 102 over the Internet. The alternate database engine may be a maintained on a single server or group of distributed servers. The established database engine may be maintained on server 104 in conjunction with a network listening device 106 for receiving submitted queries. In a UNIX environment, the server 104 may be in further communication with other UNIX processing devices 108 that maintain database files and the like utilized by the server 104. The server 104 may store database management software, relational database tables for stored databases, index files for stored databases, and the like, the functions of which are readily known to one of ordinary skill in the art.

Further specific functions and operations of user terminals 110-114, alternate database server 102, and established database server 104 are discussed further below.

Figure 2:
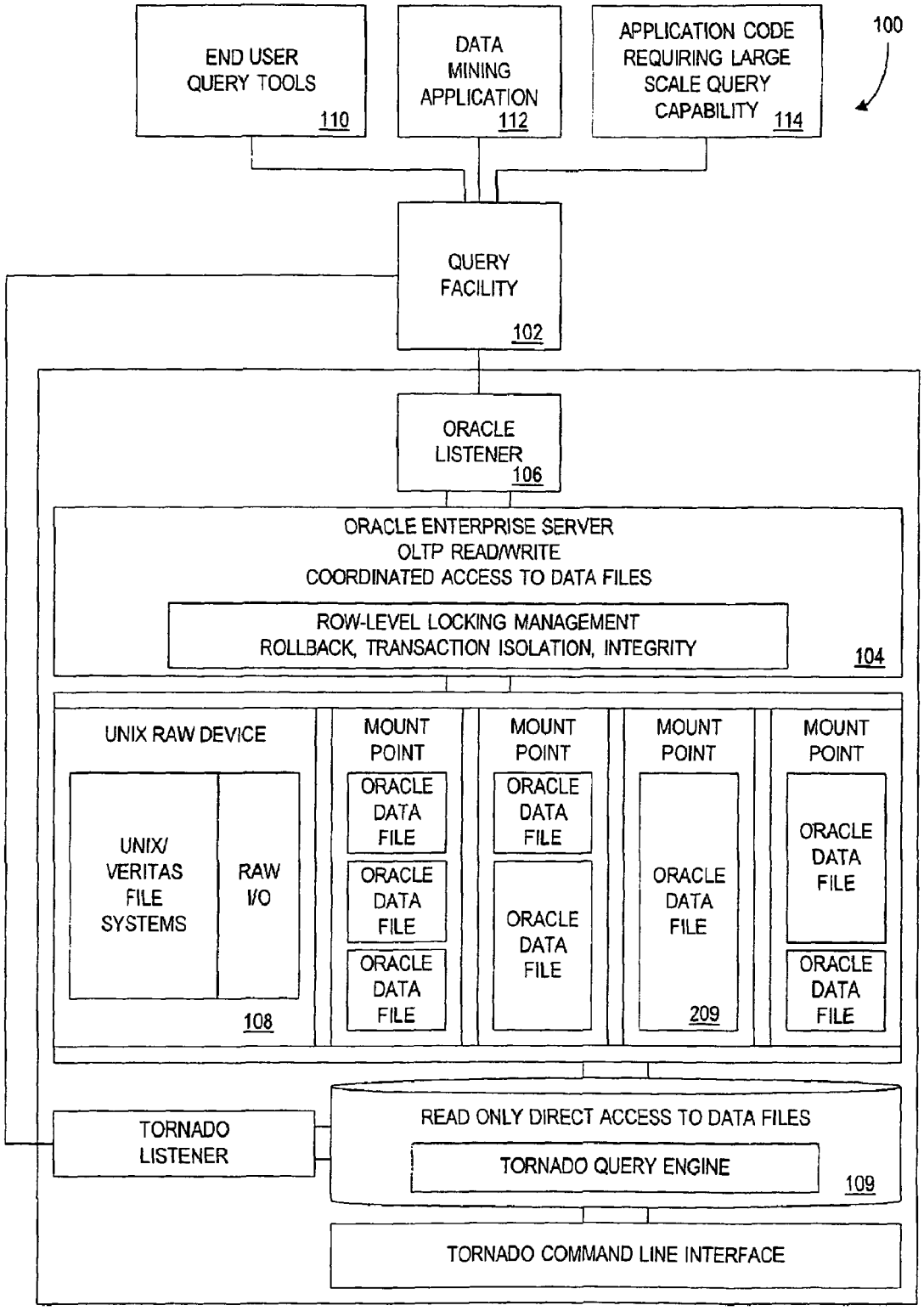
FIG. 2 is a diagram of a second exemplary network for implementing the alternate database engine of the present invention.

In FIG. 2, there is depicted a second exemplary network configuration for the network 100, in which the established database server 104 is in further operative communication with a query optimization server 109 that may be utilized by the network 100 to evaluate submitted database commands to determine their impact on system resources, and re-direct, edit, reject or limit data output based on the evaluation of the database command.

A query optimization system of the present invention is operative to intercept an individual query containing search parameters and logical arguments, and dynamically process the same on a query-by-query basis to determine its projected impact on system resources of a database engine that will process the query. Groups of such queries may be intercepted and evaluated in this manner. The resources to be evaluated may include: (i) a number of relational databases to be utilized in fulfilling the query, (ii) a size of the data fields and number of rows and/or columns to be searched for the query, (iii) an availability of hardware resources (such as processing time, memory, input/output transfer rates and disk space usage) of a system maintaining the database, (iv) a number of relational database tables to be employed for the query, (v) a limitation to be imposed on a size of a query result set, a number of rows and/or columns of data to be returned in a query result set, (vi) a cost of a previously-stored query with similar parameters and (vii) a number of function calls employed by the query.

Individual query parameters may be evaluated during the screening process performed by the present system. For example, query parameters, such as search terms and logical arguments, may be in a structured query language (SQL) format, or other similar database query formats. The query parameters may be optimized by available third-party query optimization tools known to those of ordinary skill in the art. When multiple tools are available, the system of the present invention may select one of such tools for performing query optimization, based on historical performance of the tools or by intended performance improvements of the tools.

The user rights of the user submitting the query may also be evaluated by the present system. The user rights may include an assigned accessibility right of a user, based on a class or category of a user. In addition, user rights may be based on historical system resource requirements of the user's previous queries, and further, upon the historical scores of the user's previously evaluated queries.

In various embodiments of the present invention, all such evaluations described above must take place prior to submission of the query to the database engine. In some embodiments, the query is submitted by a user terminal to a database engine, and intercepted and analyzed by a separate screening server prior to receipt by the database engine. In this manner, the screening server may save utilization of the system resources of the database engine by first evaluating the query.

Queries that are intercepted and screened in any or all of these manners may be assigned a final impact rating. The rating may be determined, for example, by identifying the various system resources that may be impacted impacted, assigning a weight to each impacted resource, and generating a score reflective of the results. Other useful weighted computational models may also be used. The generated rating is then compared to one or more threshold values set by a database administrator, determined by an analysis of available system resources, or the like.

If the rating surpasses the threshold value, the query may be rejected. Alternatively, the screening server may negotiate or assign a limited result set to be provided in response to the query. This limitation is then communicated to the database engine upon submission of the query. If, on the other hand, the rating does not surpass the threshold value, the query may be submitted to the database engine for processing. The result sets generated by the database engine in response to the query may then be communicated to the user by either the database engine or the screening server. In the latter case, the query parameters may nonetheless be optimized by the previously described third-party optimization tools prior to submission to the database engine.

In various embodiments, the system of the present invention can optionally prioritize and queue queries for the database engine based on the priority of the query or the user submitting the query. The system may further pause processing of lower priority queries so that higher priority queries may be processed and/or completed first.

Figure 3:
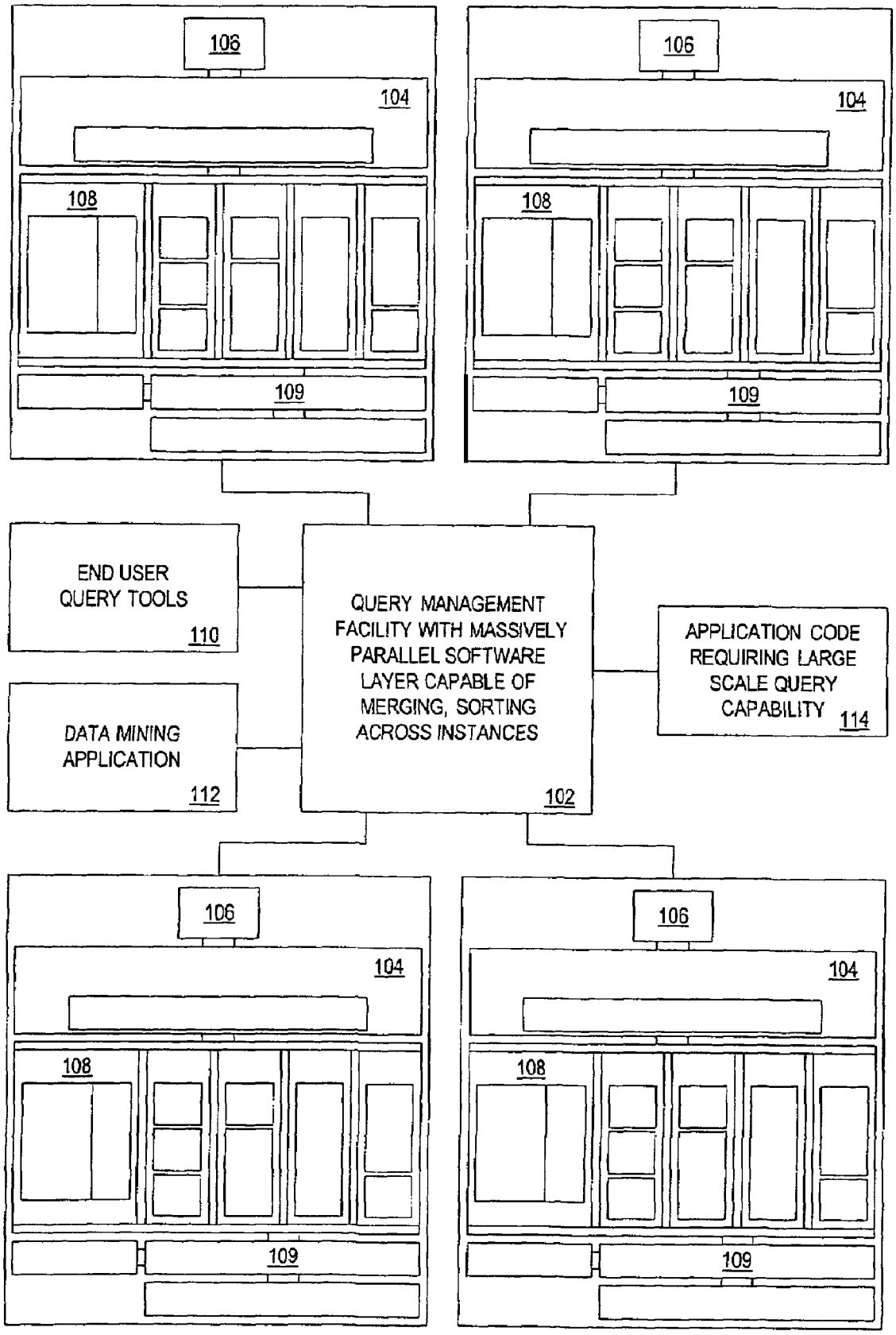
FIG. 3 is a diagram of a third exemplary network for implementing the alternate database engine of the present invention.

In FIG. 3, there is depicted a third exemplary configuration for the network 100 in which a single alternate database server 102, in conjunction with a single query optimization server 109, are in operative communication with a plurality of established database engines 104 in a massively parallel architecture. As displayed in FIG. 4, the network 100 may be configured with a single alternate database server 102 in communication with a plurality of servers 104, 109 in a massively parallel architecture.

Other operative network configurations for network 100 are readily contemplated to be employed by the present invention.

Figure 4:
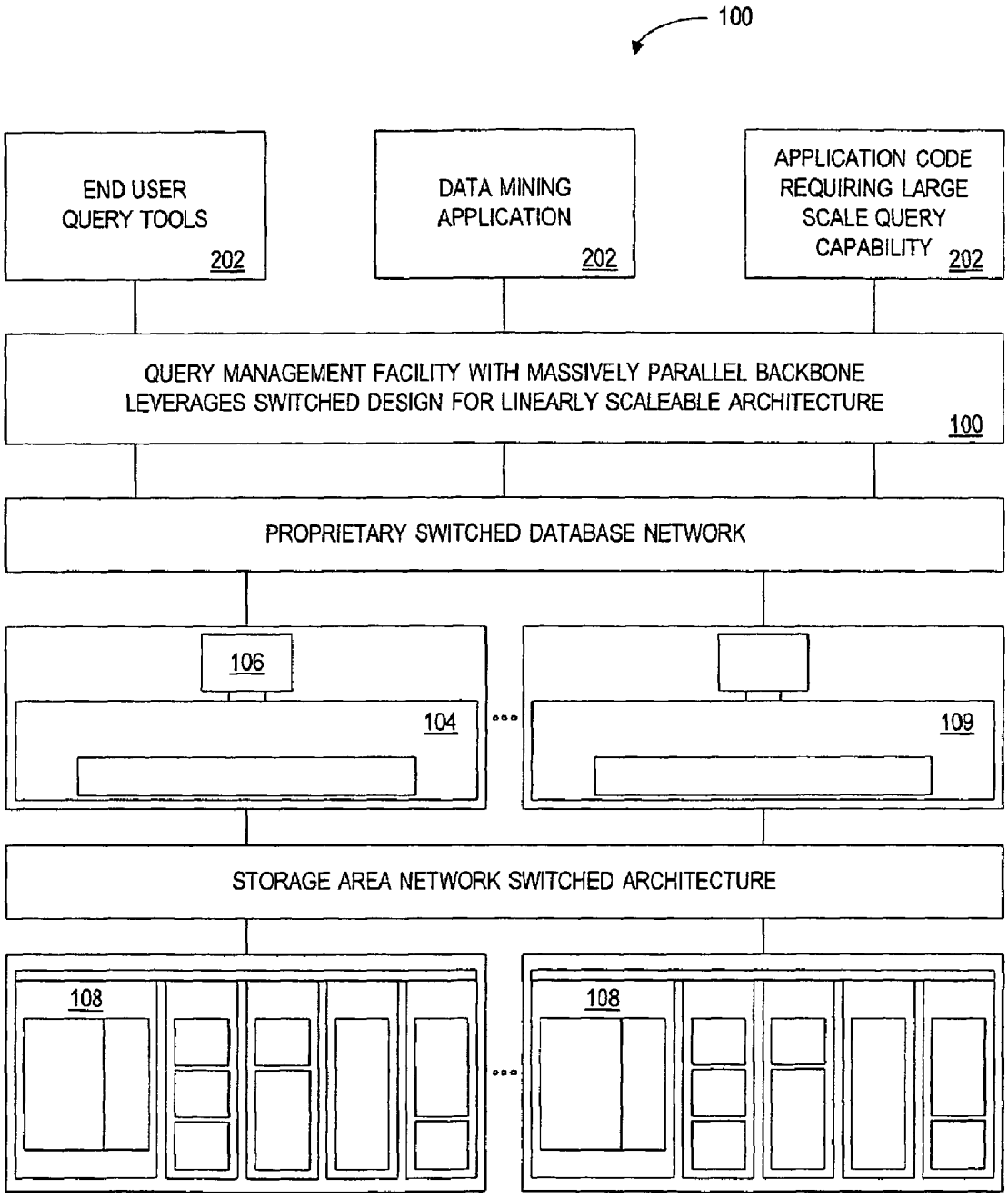
FIG. 4 is a diagram of a fourth exemplary network for implementing the alternate database engine of the present invention.
Figure 5:
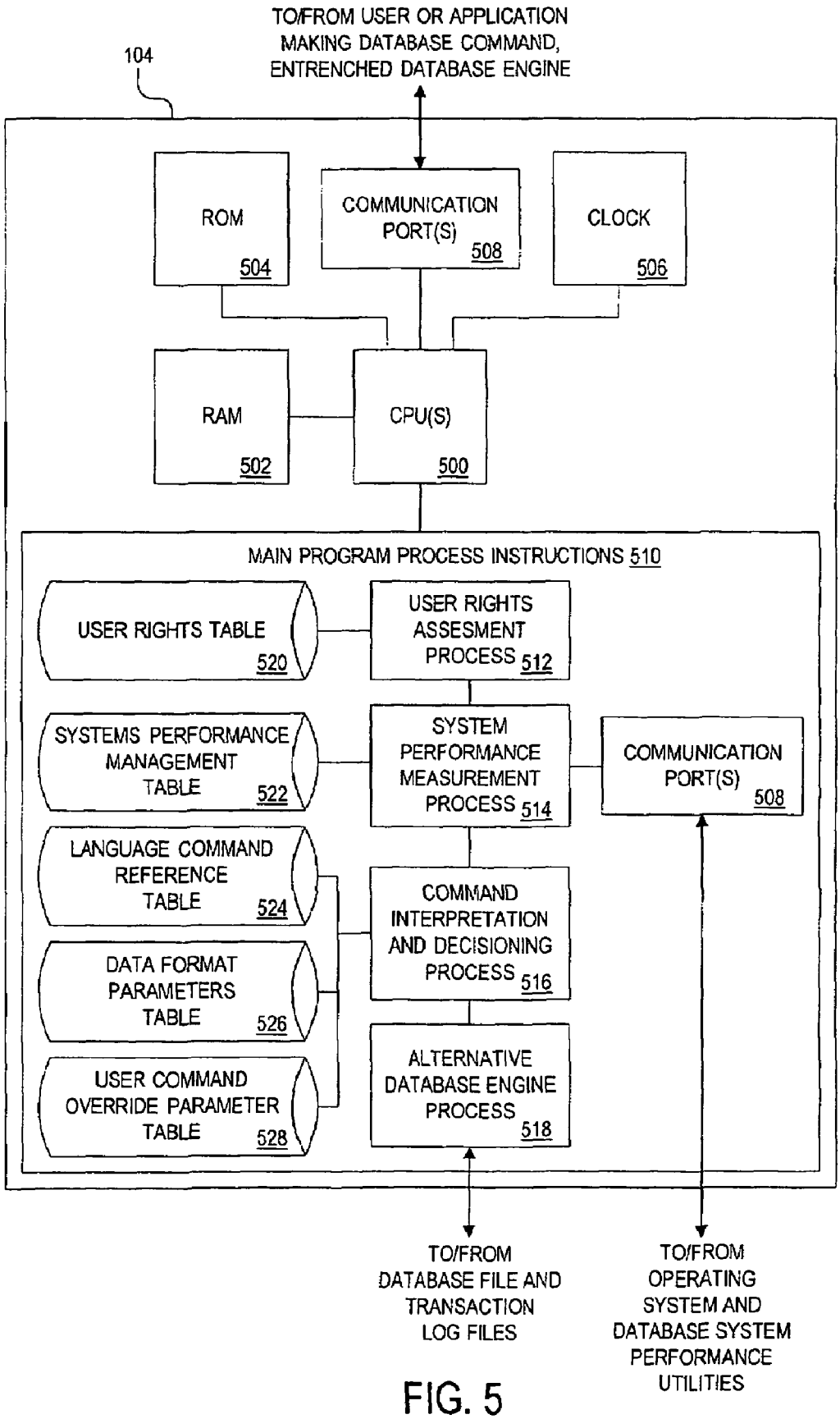
FIG. 5 is a schematic block diagram of an exemplary server for use in the networks of any of FIGS. 1-4.

Turning now to FIG. 5, displayed therein are exemplary components of a computing device, such as an alternate database server 102, for use in any of the configurations described above with respect to FIGS. 1-4. It should be understood that any computing device described herein may share similar configurations to server 102. However, for sake of brevity, the discussions of hardware components used by various devices herein will be made in reference to the server 102 only.

The primary component of the alternate database server 102 is a central processing unit (CPU) or microprocessor 500, which may be any commonly available microprocessor, such as the SunSPARC family of processors manufactured by SUN MICROSYSTEMS. The CPU 500 may be operatively connected to further exemplary components, such as random access memory (RAM) 502, read-only memory (ROM) 504, a clock 506, input/output devices such as communication port(s) 508, and a memory 510. The memory 510, in turn, may store one or more application and operating system programs, such as user rights assessment processing instructions 512, system performance measurement processing instructions 514, command interpretation processing instructions 516 and alternate database engine process instructions 518.

The memory 510 may further store various system-based database files, used by the server 104 to evaluate and process data commands. Such database files include a user rights table 520 for storing database access rights of a plurality of users, a system performance management table 522 for determining database command impact against parameters stored therein, a language command reference table 524 for converting database commands between various supported formats, a data format parameters table 526 for storing format parameters of stored data and a user command override parameter table 528 used to store any user-specific customizations to language translation processing.

The CPU 500 operates in conjunction with RAM 502 and ROM 504 in a manner well known in the art. The RAM 502 may be a suitable number of Single In-line Memory Module (SIMM) chips having a storage capacity (typically measured in kilobytes or megabytes) sufficient to store and transfer, inter alia, processing instructions utilized by the CPU 500, that in turn may be may be received from the application programs 512-518. The ROM 504 may be any permanent, non-rewritable memory medium capable of storing and transferring, inter alia, processing instructions performed by the CPU 500 during a start-up routine of the alternate database server 102.

The clock 506 may be an on-board component of the CPU 50 which dictates a clock speed (typically measured in MHz) at which the CPU 500 performs and synchronizes, inter alia, communication between the internal components of the alternate database server 102.

The communication port(s) 508 may be one or more commonly known devices used for receiving system operator inputs, network data, and the like and transmitting outputs resulting therefrom. Accordingly, exemplary input devices may include a keyboard, a mouse, a voice recognition unit and the like for receiving inputs from an operator of the alternate database server 102. Additionally, output devices may include any commonly known devices used to present data to an operator of the alternate database server 102 or to transmit data over the computer network 100, described further below. Accordingly, suitable output devices may include a display, a printer and a voice synthesizer connected to a speaker. Other output devices may include a telephonic or network connection device, such as a communication port, a telephone modem, a cable modem, a T-1, T-2 or T-3 connection, a digital subscriber line or a network card, or any other device for communicating data to and from other computing devices over the computer network 100. In an environment in which high numbers of users are involved, it is preferred that the communications devices used as communication ports 508 have capacity to handle high bandwidth traffic in order to accommodate communications with a large number of users.

The memory 510 may be an internal or external large capacity device for storing computer processing instructions, computer-readable data, and the like. The storage capacity of the memory 510 is typically measured in megabytes or gigabytes. Accordingly, the memory 510 may be one or more hard disk drives and/or any other computer readable medium that may be encoded with processing instructions in a read-only or read-write format. Further functions of and available devices for memory 510 will be apparent.

The memory 510 may further store, inter alia, a plurality of operating system application programs which may be any one or more of UNIX-based system such as LINUX, or one or more personal computer (PC) programs, such as a web hosting program and a database management program of the type manufactured by ORACLE, each of which may be necessary to implement various embodiments of the present invention. In an Internet environment, web hosting software may include functionality sufficient to read JAVASCRIPT, hypertext markup language (HTML), extensible markup language (XML) and other similar programming languages typically used in conjunction communicating data between clients and servers over the Internet.

In any type of network environment, the application programs may also include a database management program, of the type commonly manufactured by ORACLE CORP. to store and maintain various databases as described below at the alternate database server 102. For example, the database programs may be used to maintain the user rights table 520, the system performance management table 522, the language command reference table 524, the data format parameters table 526 and the user command override parameter table 528. Further or fewer databases may be used in certain embodiments of the present invention. It should be readily appreciated that any number of database files presented herein may be configured into any number of relational databases. In addition, configurations other than database formats may be used to store the data maintained in these exemplary databases.

Figure 6:
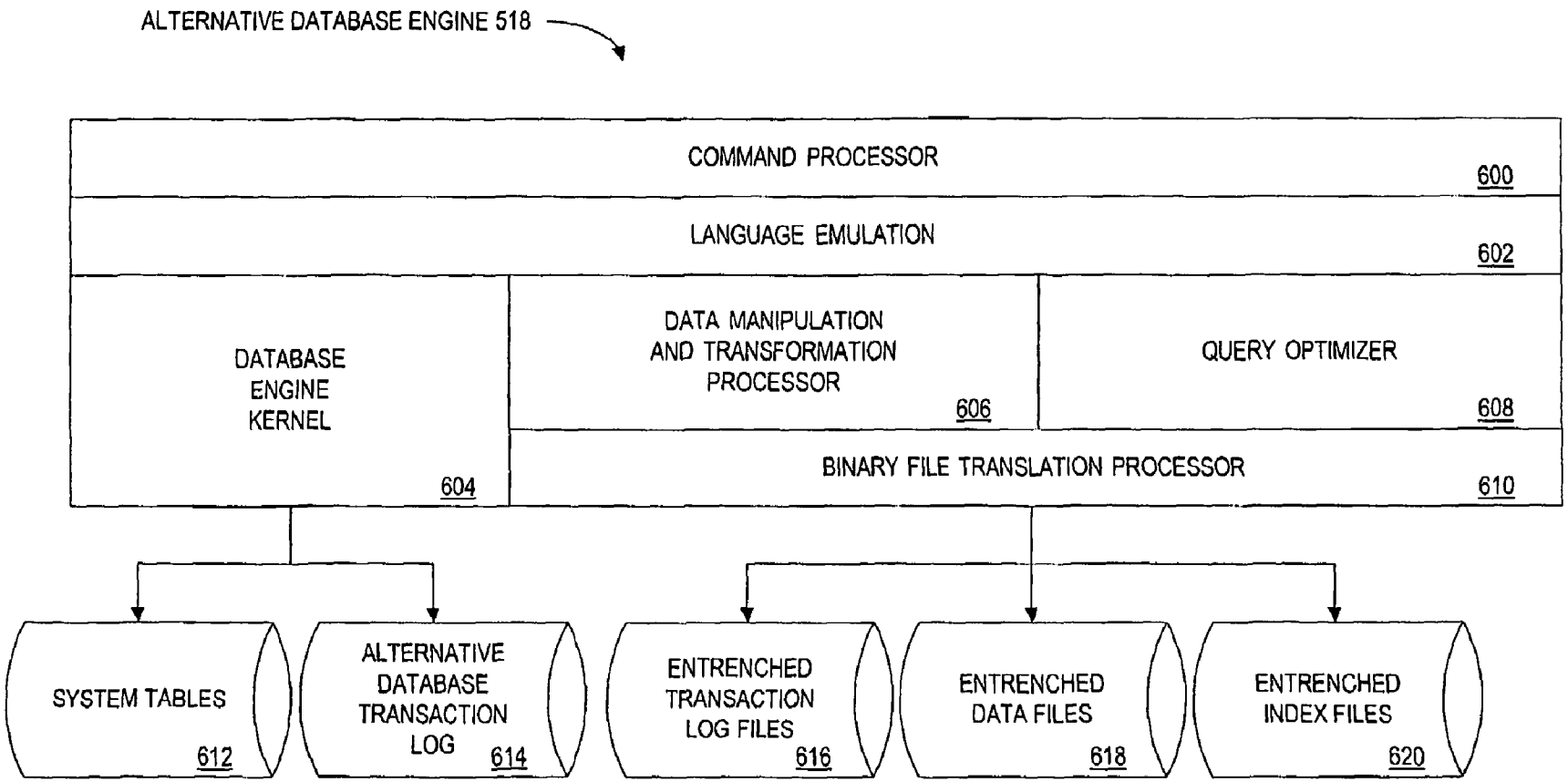
FIG. 6 is an illustration of exemplary protocol layers used by the alternate database engine established on the server of FIG. 5.

Turning now to FIG. 6, therein is depicted an exemplary programming structure 518 for the alternate database engine maintained by the alternate database server 102. The structure 514 includes a top-most command processing layer 600, whereby database commands are processed by the alternate database engine. The structure 518 may further include a language emulation layer, by which a plurality of database languages may be recognizable and translatable by the alternate database engine. The structure 518 further includes a database engine kernel 604 for managing native system tables 612 storing system usage parameters and a native transaction log 614 for storing read and write operations to data files maintained by the alternate database server 102. The structure 518 may also include a data manipulation and transformation processor layer 606 and a query optimizing layer 608 for evaluating and optimizing database commands received by the alternate database engine. Finally, the structure 518 may include a binary file translation processor for converting database commands and received data into a desired format that is compatible with the established database engine, for example, by referencing transaction log files 616, database files 618 and index files 620 maintained by the established database engine on server 10.

Other software layers, such as network communication layers and the like (not shown), may also readily be employed to implement the present invention.

Figure 7A:
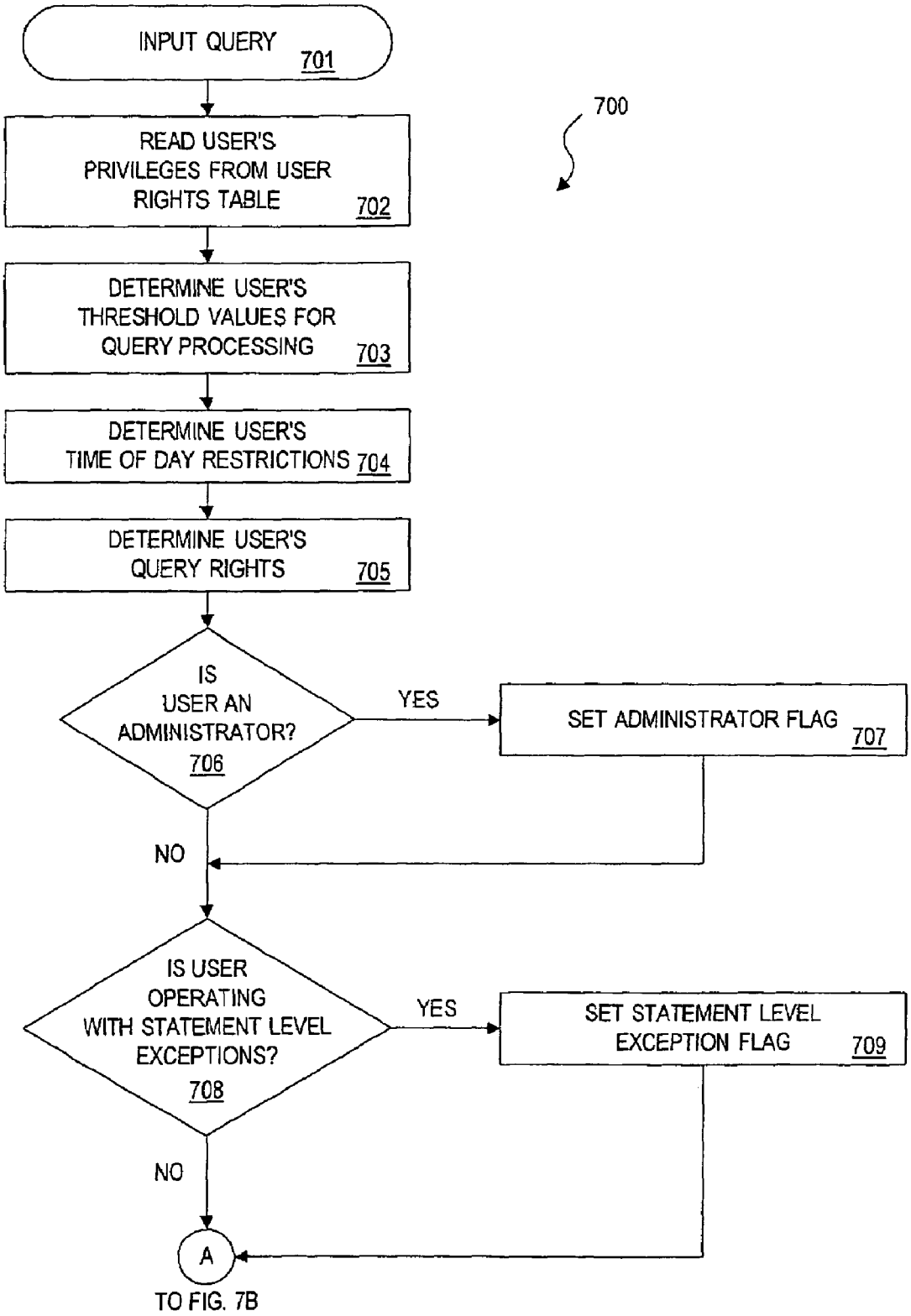
Figure 7B:
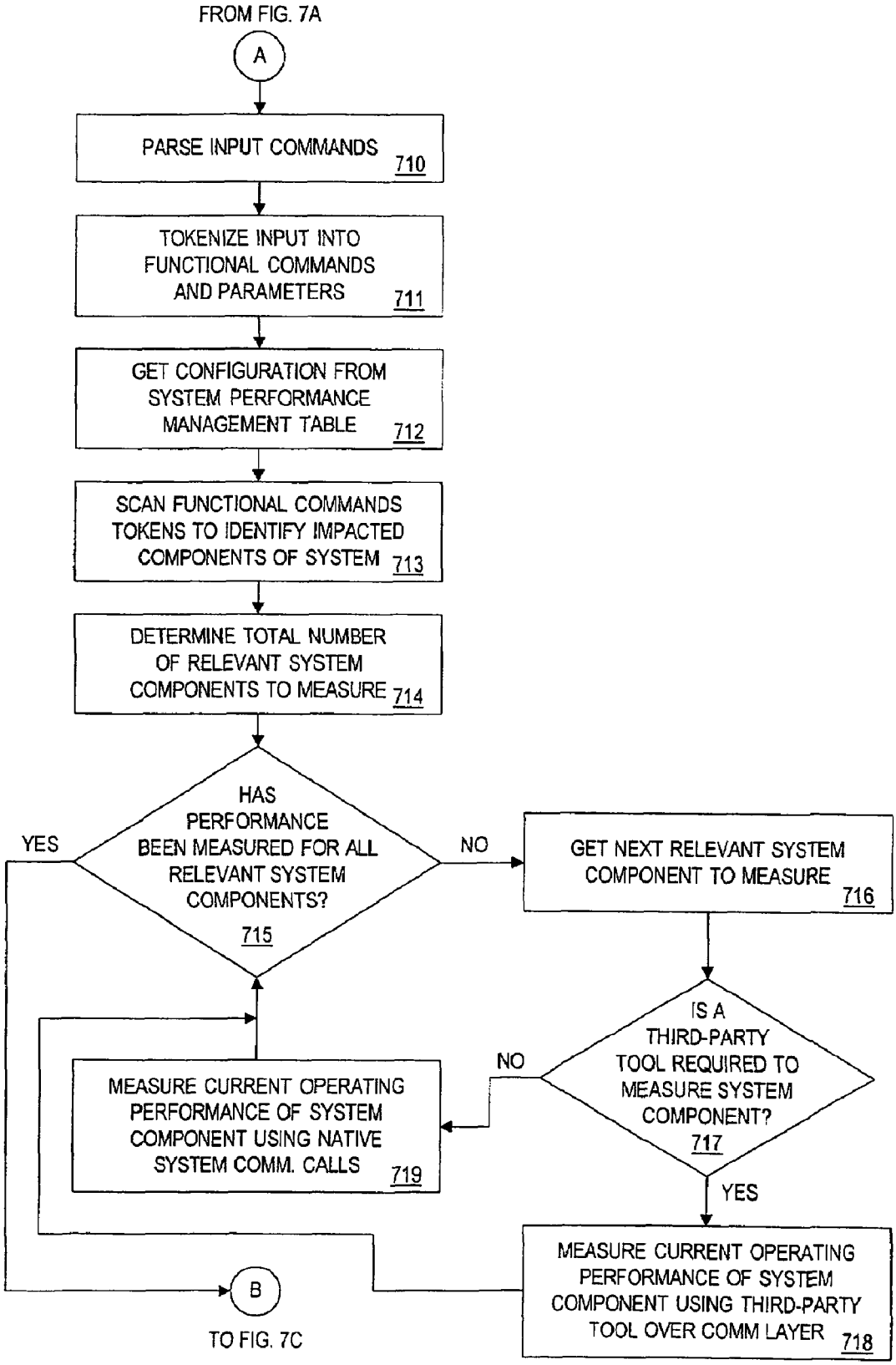
Figure 7C:
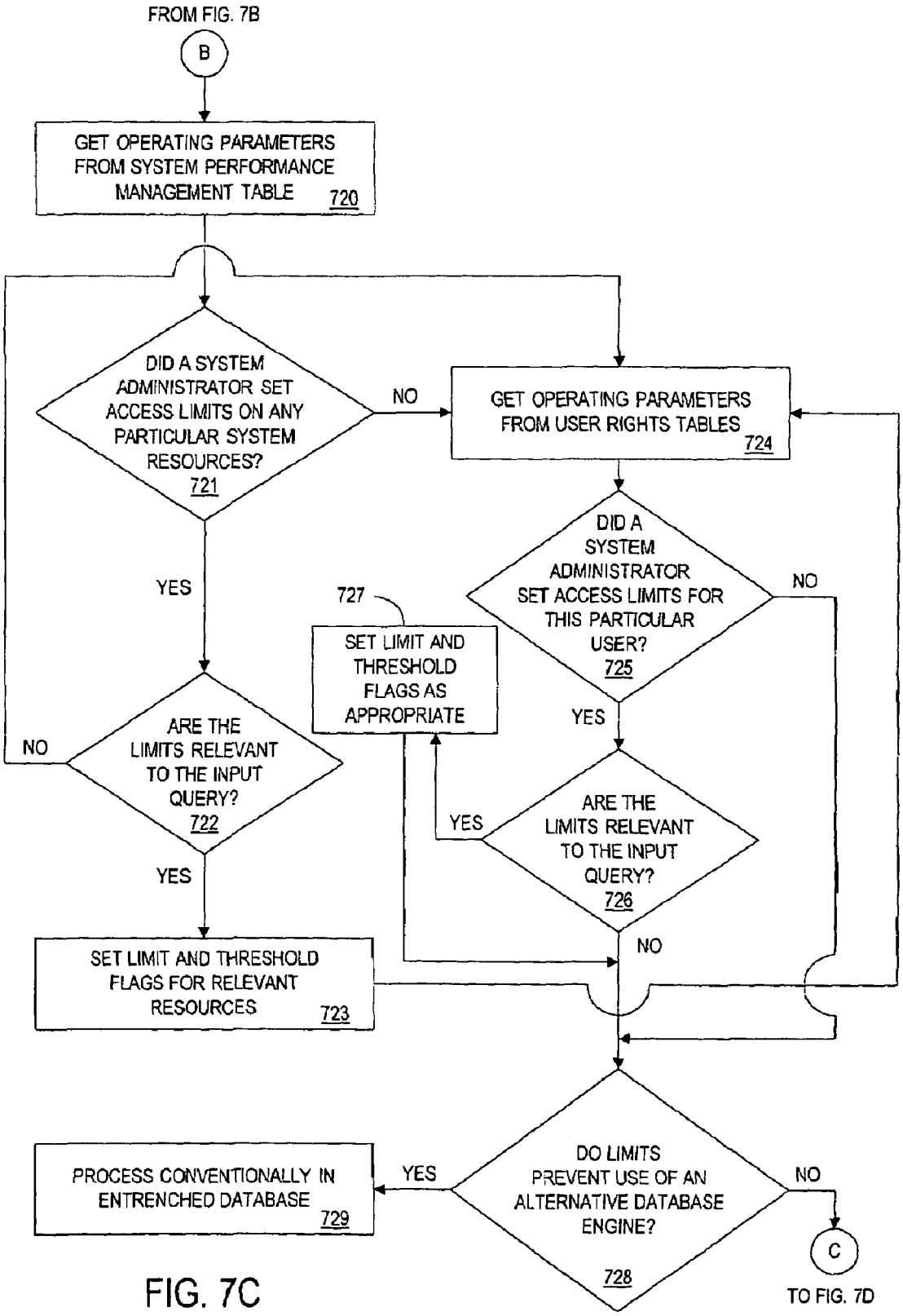
Figure 7D:
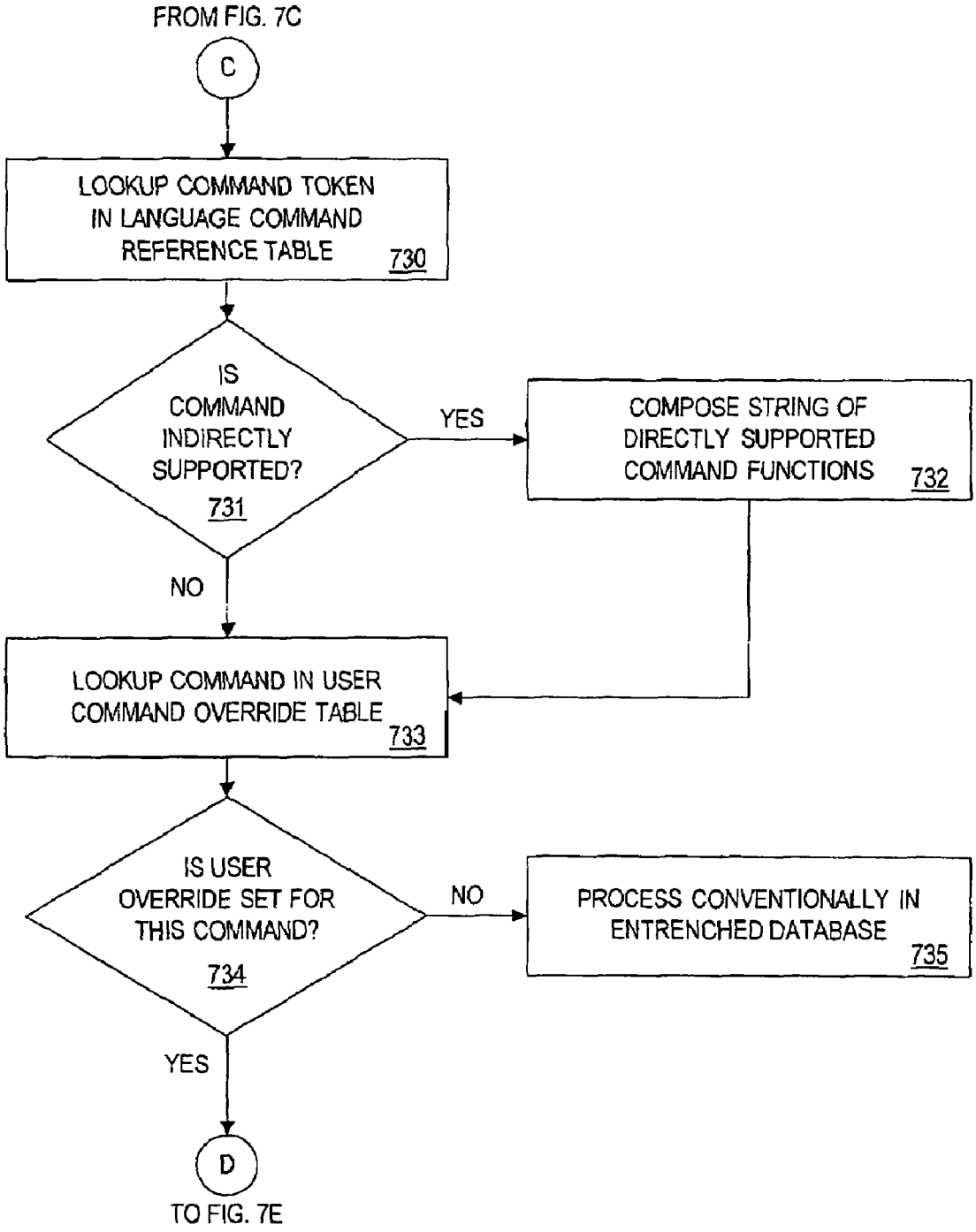
Figure 7E:
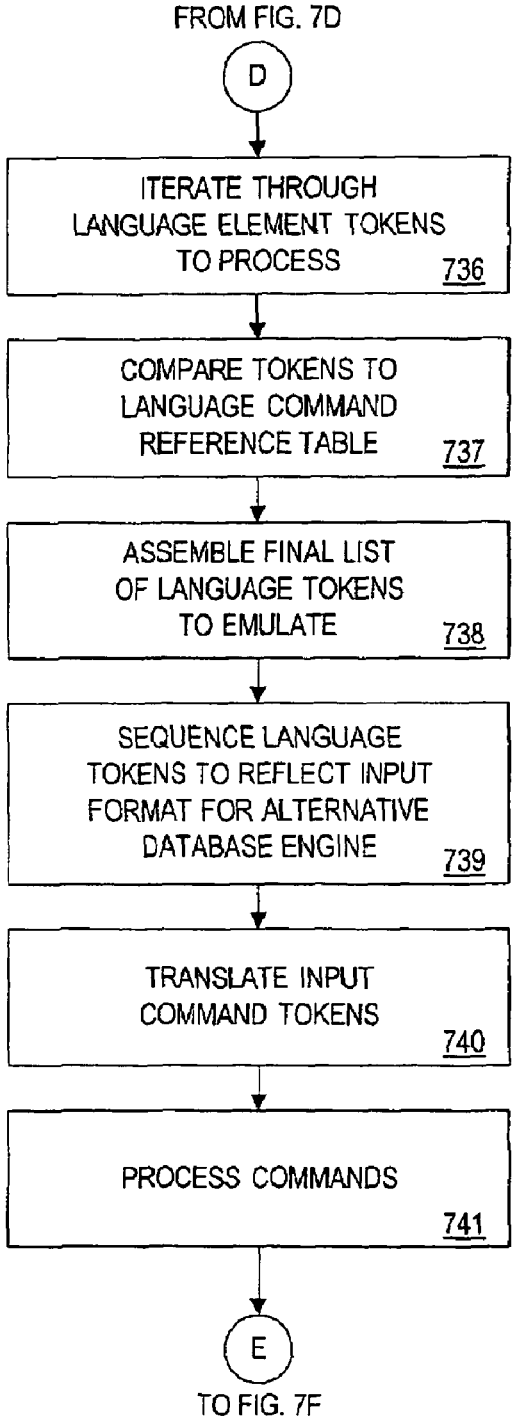
Figure 7F:
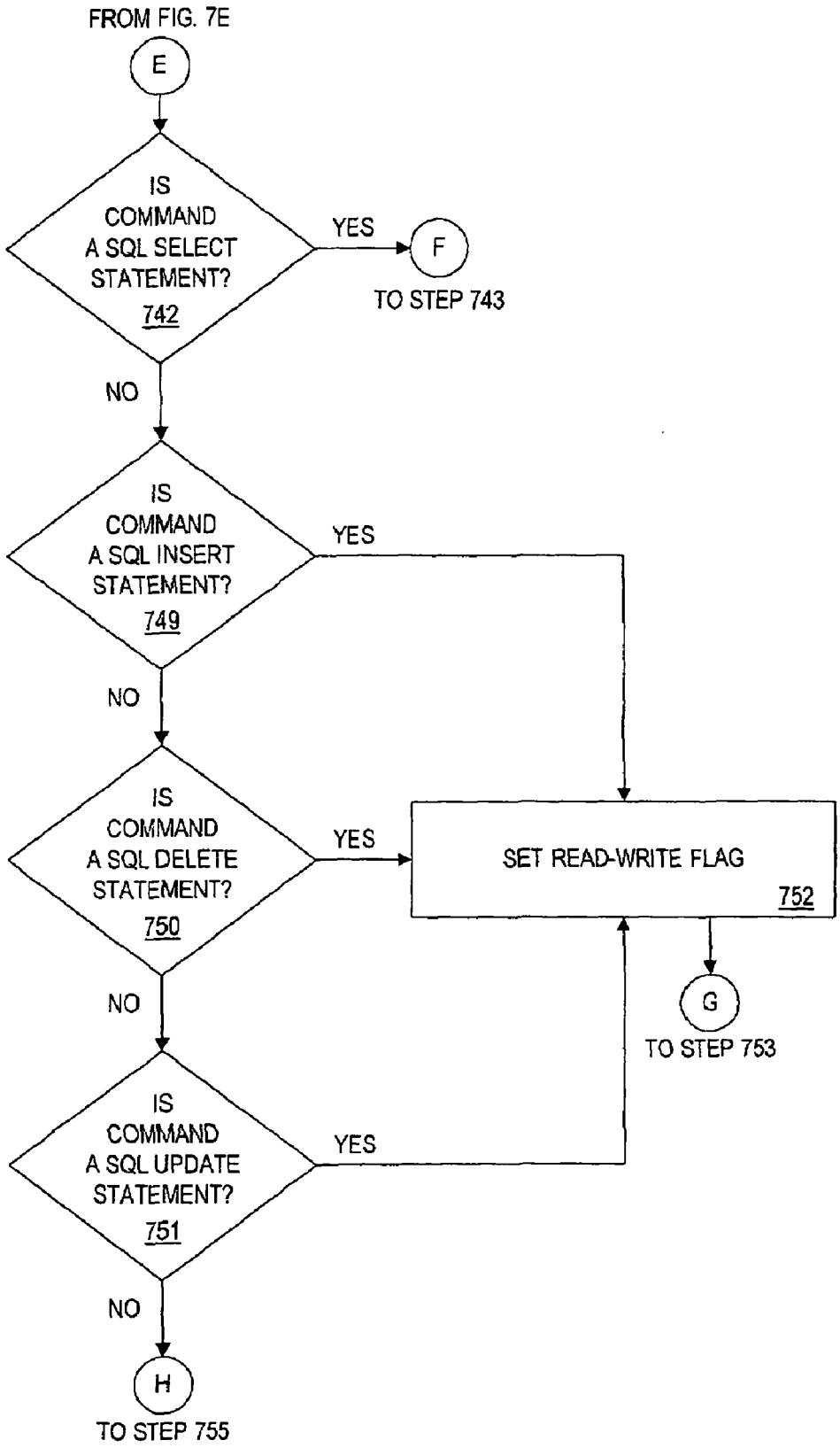

FIGS. 7A-7F3 depict a general process 700 for intercepting and executing database commands performed by the alternate database engine 500 of FIG. 5 in any of the various network configurations described with respect to FIGS. 1-4. The process 700 begins when a database command, such as a query, is submitted by a user to the database engine (step 701). The input query may be obtained in a transparent manner. That is, the user may not receive an indication that the query intended for the established database engine has been intercepted by the alternate database engine. In other embodiments, queries may be intercepted by batch submission or by providing direct access to the alternate database engine to a plurality of users.

The alternate database engine receives an identification of the user and accesses the user rights table 520 to determine the user privileges of the user (step 703). The user rights table may store, for example, an identification of the user and user access rights. In various embodiments, it is possible to allow or disallow access to users who are not listed in the user rights table 520.

Based on the user rights table information for the user, the alternate database engine then determines the user's threshold values for query processing (step 703), further determines whether any time of day restrictions apply to the user (step 704), and also determine the user's query rights (step 705).

The alternate database engine then determines whether the user is an administrator (step 706). If so, the process continues to step 707 where the alternate database engine sets an administrator flag, otherwise, the process 700 continues to step 708 below.

At step 708, the alternate database engine determines whether the user is operating with statement-level exceptions or any command-level overrides intended to alter processing beyond default processing rules established by an administrator or the like. (step 708), If, so, step 709 is performed. Otherwise, the process 700 continues to step 710 below, described with respect to FIG. 7B.

The alternate database engine next sets a statement level exception flag (step 709). The alternate database engine then may set additional appropriate flags which are used later in the process to determine whether to reject, allow or edit a query submitted by the user, based on query parameters. This information may be determined from the access of the user rights table 520 described previously above, or in any other known manner.

Continuing now to FIG. 7B, the process 700 next involves the alternate database engine parsing the received query (step 710). The query is tokenized into functional commands and query parameters (step 711). The alternate database engine then retrieves configuration information from the system performance management table 522 (step 712). The system next assesses database management parameters, for example, by accessing the system performance management table 522 which may store, inter alia, performance parameters of the alternate database engine. The system performance management table 522 may accordingly store such parameters as (i) processor speed and usage, (ii) available memory, (iii) available input/output resources, (iv) usage and disk resources and usage, and (v) preferences set by an administrator of the administrator of the alternate database engine. These parameters may be dynamically updated based on the current operating conditions of the alternate database engine or the established database engine.

Continuing to step 713, the alternate database engine then scans the functional command tokens to identify impacted components of the alternate database server 102. Alternatively or in addition thereto, impacted components of the established database server 104 may be determined and analyzed in this process 700. The alternate database engine then determines a total number of relevant system components to measure (step 714) and further determines whether performance has been measured for all relevant components (step 715). If so, the process 700 continues to step 720 of FIG. 7C, otherwise, the process 700 continues to step 716.

The alternate database engine, at step 716, retrieves a next relevant component to measure and determines whether a third-party tool is required to measure the next system component (step 717). If so, the process 700 continues to step 718. Otherwise, the process 700 continues to step 719 below.

At step 718, the alternate database server measures the current operating performance of system component using third party tools, after which the process returns to step 715 above.

At step 719, the alternate database engine measures the current operating performance of system component using native system (step 719), after which the process 700 returns to step 715 above.

Continuing now to FIG. 7C, the process 700 next requires that the alternate database engine retrieve operating parameters from the system performance management table 522 (step 720) and to determine whether an administrator has set access limits on particular system resources (step 721). If so, the process 700 continues to step 722. Otherwise, the process 700 continues to step 724 below.

At step 722, the alternate database engine determines whether any such limits are relevant to the input command by comparing tokens to the stored limit parameters (step 722). If the limits are relevant, the process continues to step 723. Otherwise, the process 700 continues to step 724 further below.

The alternate database engine may then set limit and threshold flags for the relevant resources in accordance with the limits set by the administrator (step 723). The alternate database engine next retrieves the operating parameters from user rights table 520 (step 724).

The alternate database engine next determines if the administrator set limits on operating parameters for the user submitting the query based on the stored user rights (step 725). If so, the process 700 continues to step 726. If not, the process continues to step 728 further below.

At step 726, the alternate database engine determines whether the established limits are relevant to the particular query. If so, the process 700 continues to step 727. if not, the process 700 continues from step 728 below.

The alternate database then set limit and threshold flags as appropriate (step 727). At step 728, the alternate database engine determines whether the established limits prevent use of the alternate database engine to process the query. If so, the process continues to step 729. If not, the process 700 continues to step 730 described further below with respect to FIG. 7D.

At step 729, the alternate database engine processes the query conventionally by passing it to the established database engine, due to the impact the query would have on the resources of the alternate database server 102.

Continuing to FIG. 7D, the alternate database engine looks up a command token from the parsed query in the language command reference table 524 (step 730). The alternate database engine then determines whether the command is indirectly supported (step 731). If so, the process 700 continues to step 732 below. Otherwise, the process 700 continues to step 733.

At step 732, in order to determine if the given user has customized how the alternate database engine should handle specific language commands, the alternate database engine composes a string of directly supported command functions corresponding to the query, and looks up the command in the user command override table 528 (step 733). If a user override command is set for the query (step 734), the process 700 continues to step 735. Otherwise, the process 700 continues to step 736 of FIG. 7E.

At step 735, the query is processed conventionally by passing it to the command layer of the established database engine, after which process 700 ends.

Continuing to FIG. 7E, the alternate database engine next iterates through language element tokens (step 736), compares the language tokens to the language command reference table 524 (step 737), assembles a final list of language tokens to emulate (step 738), sequences the language tokens to reflect the input format for alternate database engine (step 739), translates the query tokens (step 740) and processes the query without accessing a command layer of the established database engine (step 741). The alternate database engine may also be programmed to execute read-only commands, exclusive of read-write and write commands, in certain embodiments of the present invention. A benefit of performing read-only commands is in using the alternate database server as a low-cost mechanism for increasing overall database system availability and redundancy in an enterprise computing environment.

Continuing now to FIGS. 7F1-7F3, the alternate database engine determines whether the query is a SQL select (or functionally equivalent) statement (step 742) If so, the process 700 continues to step 743. Otherwise, the process 700 continues to step 749 further below.

At step 743, a read only flag is set by the alternate database engine. Tokens are parsed from the select statement (step 744) and the alternate database engine then determines whether the query calls for temporally sensitive data by, for example, comparing the tokens to a list of heavily updated data tables (step 745). If the query is temporally-sensitive (step 746), the process 700 continues to step 747. Otherwise, the process 700 continues on to step 748 described further below.

At step 747, the alternate database engine sets a transaction log access flag, decomposes the query to a file access sequence (step 748) and initiates the binary file access and translation process 800, described below with respect to FIGS. 8A-8C.

Write commands may unduly impact system performance of the alternate or established database servers. Accordingly, any write commands, such as insert commands and delete commands are evaluated.

At step 749, the alternate database engine next determines if the query includes an insert statement. If so, the process continues to step 752. If not, the process continues at step 750 further below.

At step 750, the alternate database engine next determines if the query includes a delete statement. If so, the process continues to step 752. If not, the process continues at step 751 below.

At step 751, the alternate database engine next determines if the query includes an update statement. If so, the process 700 continues to step 752. If not, the process continues at step 755, described further below.

At step 752, the alternate database engine sets a read-write flag and determines whether the alternate database engine can obtain read-write control over data filein step 753. If so, the process continues to step 754. Otherwise, the process continues to step 756 below.

Figure 8A:
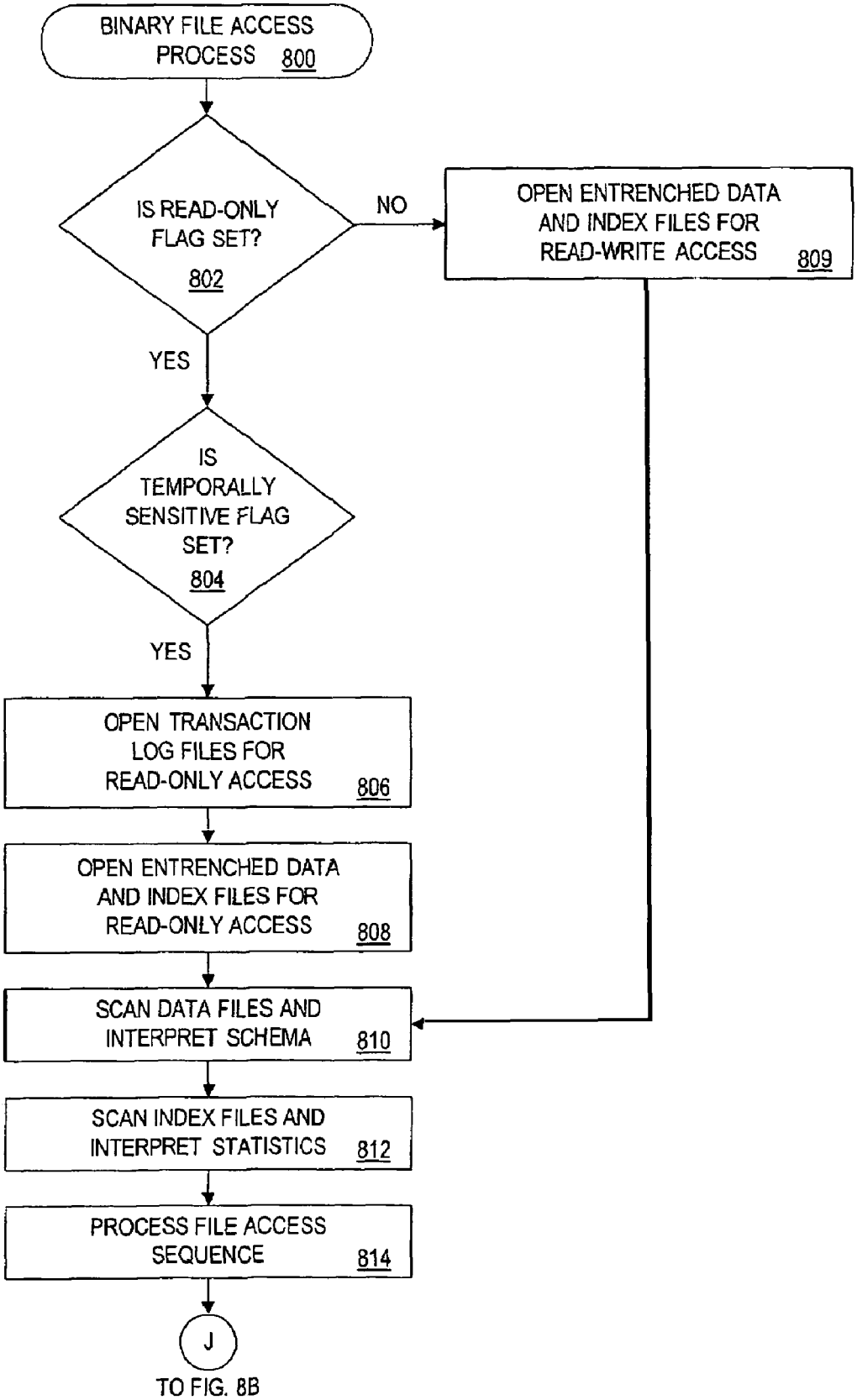
FIGS. 8A-8C are a flowchart depicting an exemplary binary file access process for translating database commands according to certain embodiments of the present invention
Figure 8B:
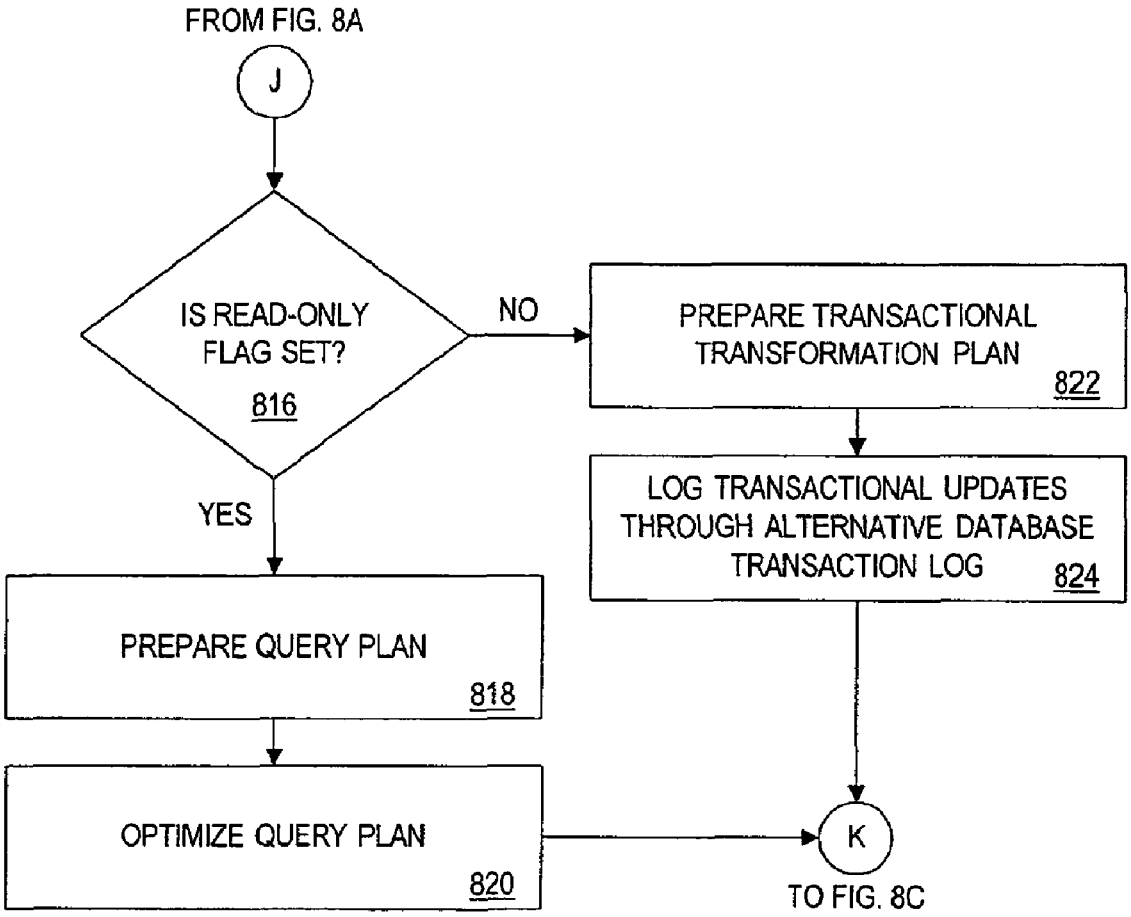
Figure 8C:
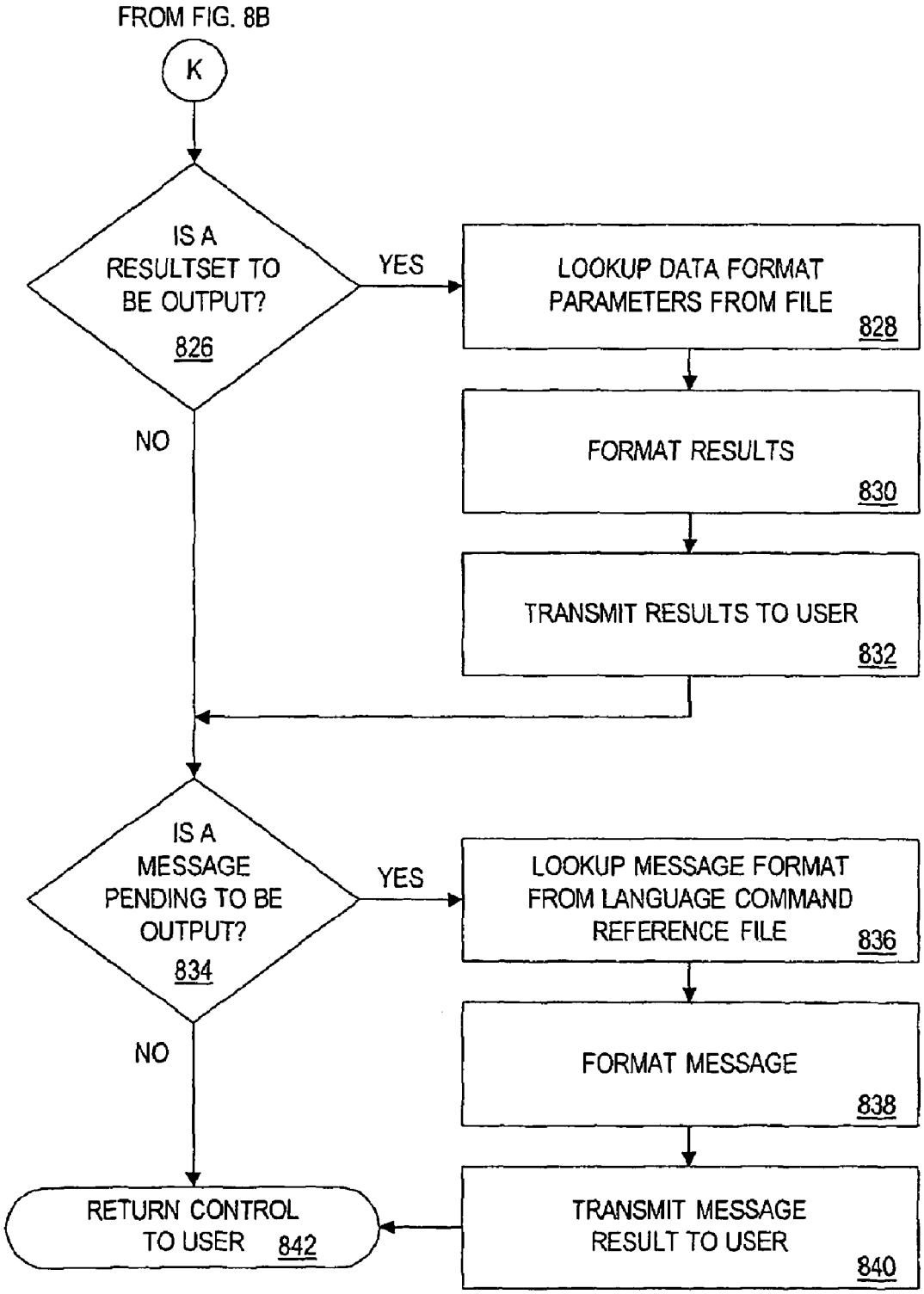

At step 754, the alternate database engine decomposes the query to a file access sequence, after which the binary file access process 800, described with respect to FIGS. 8A-8C is initiated.

Returning to 755, the alternate database engine determines whether the query is a proprietary data-definition language command (for example, a "create table" command, or an "alter table" command). If so, the process 700 continues to step 756, and if not, the process 700 ends.

At step 756, the alternate database engine determines whether a corresponding translated query is available in the alternate database engine. If so, the alternate database engine initiates the binary file access process 800 of FIGS. 8A-C. Otherwise, the process 700 ends.

Turning to FIGS. 8A-8C, a binary file access process 800 is depicted in which queries and commands that are submitted in a format of the established database engine are translated to a format recognizable by the alternate database engine. The binary translation processor converts proprietary binary data, index, transaction log structures and the like into a standardized internal form suitable for processing with alternate database The process 800 begins by determining whether a read-only flag is set (step 802). If so, the process 800 continues to step 804. Otherwise, the process continues to step 809, described further below.

Next, the alternate database engine determines whether a temporally-sensitive data flag has been set (step 804). If so, the process 800 continues to step 806 below. If not, the process 800 continues on to step 808.

The alternate database engine opens transaction log files of the established database server for read only access (step 806) and further opens data and index files for the established database engine for read only access (step 808). The data files are then scanned (step 810) to interpret the data schema of stored data, the alternate database engine further scans index files and interprets data statistics based on the same (step 812). From this information, a file access sequence is processed (step 814).

Continuing now to FIG. 8B, the alternate database engine next determines if a read-only flag is set (step 816). If so, the process 800 continues to step 818. Otherwise, the process 800 continues to step 822 below.

At step 818 a query plan is prepared. At step 820, the query plan may be optimized using the methods described previously, after which the process 800 continues to step 826, described below with respect to FIG. 8C.

At step 822, a transactional transformation plan is prepared, whereby data that is intended to be determined to be written to the data file is condensed to a series of specific Insert/Update/or Delete command steps. These Insert/Update/or Delete command steps are then first stored in a transaction log file (and then later applied transactionally) to help ensure data integrity. The alternate database server next updates its transactional log through alternate database transaction log 614 (step 824).

From either step 820 or 824 above, the process 800 continues to step 826 where the alternate database engine determines whether a result set can be generated and outputted to the user in response to the query. If so, the process continues to step 828. Otherwise, the process continues to step 834 described further below.

At step 828, the alternate database engine looks up data format parameters from the alternate database transaction log 614, formats the results in a manner similar to results output by the alternate database engine (step 830), and transmits the results to user (step 832).

If a result can not be generated, due to an error in the query or the lack of responsive data in the established database engine, the alternate database engine determines whether a message regarding the failed query is to be output (step 834), if not, the process 800 ends. Otherwise, the process 800 continues to step 836 where the alternate database engine retrieves the message format employed by the established database engine. The message is placed in the appropriate format (step 838) and which is then transmitted to the to the user (step 840), the process 800 then ends.

While the processes 700 and 800 have been described above with respect to a single user terminal, a single alternate database server and a single established database engine, it is contemplated that any number of such servers may be employed in an operative embodiment of the present invention, as particularly illustrated in the exemplary network configurations of FIGS. 2-4.

While the data command submitted by a user has been described herein as a database query, other database commands, such as write commands, read/write commands, indexing commands and the like may readily be employed and processed by the system of the present invention.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for processing a database command, performed by an alternate database engine, the method comprising:

receiving, from a user, a database command requiring data from a first database engine, the first database engine having a command layer for processing database commands[;] and separately processing the database command using a command layer of an alternate database engine without accessing the command layer of the first database engine;

evaluating the database command to determine system usage of the database command at the database engine, prior to execution of the database command;

determining a threshold value for system usage of the alternate database engine, wherein the threshold value is based on one or more of: estimated processor usage, estimated memory usage, input/output resource usage and disk resource usage of the alternate database engine;

generating a result of the database command; and transmitting the result to the user submitting the database command.

2. The method of claim 1, wherein the first database engine stores the data in a first database file.

3. The method of claim 1, wherein the alternate database engine stores second data in a second database file.

4. The method of claim 1, wherein the database command is compatible with one or more of: a Structured Query Language format, a Javascript Database Connectivity (JDBC) protocol and an Open-Database Connectivity protocol.

5. The method of claim 1, wherein the database command is a query.

6. The method of claim 5, said processing the database command further comprising:

evaluating the query.

7. The method of claim 6, said evaluating further comprising:

evaluating the query against system usage.

8. The method of claim 7, said evaluating further comprising:

evaluating the query based on one or more of: a parameter of the query, a number of relational databases to be accessed for the query, a size of a data field to be searched for the query, an availability of resources of a system maintaining the alternate database engine, an availability of resources of a system maintaining the first database engine, a number of relational database tables to be employed for the query, a limitation imposed on a size of a query result set, a number of columns of data to be returned in a query result set, a cost of a similar stored query and a number of function calls for the query.

9. The method of claim 7, further comprising:

submitting the query to the alternate database engine with a limit on a number of returns responsive to the query, based on said evaluating.

10. The method of claim 7, further comprising*:* editing the query, based on said evaluating.

11. The method of claim 7, further comprising:

rejecting the query, based on said evaluating.

12. The method of claim 6, wherein said evaluating comprises:

determining, prior to said processing, whether the database command requires accessing the first database engine, and if not, accessing data stored only by the alternate database engine.

13. The method of claim 12, said determining further comprising:

translating the query to a native format of the alternate database engine.

14. The method of claim 6, said evaluating further comprising:

determining whether the query requires accessing temporally sensitive data, and if so, accessing a transaction log of the first database engine.

15. The method of claim 1, wherein said transmitting further comprises:

transmitting the result in a format of the first database engine.

16. The method of claim 1, further comprising:

storing second data in a database file maintained by the alternate database engine.

17. The method of claim 16, said processing further comprising:

determining whether the database command requires at least a portion of said second data, and if so, identifying said portion responsive to the database command.

18. The method of claim 1, further comprising:

receiving new data to be provided responsive to database commands; and storing said new data in a database file maintained by the alternate database engine.

19. The method of claim 1, further comprising:

receiving new data to be provided responsive to database commands; and storing said new data in a database file maintained by the first database engine.

20. The method of claim 1, said processing further comprising:

translating the database command to a native format of the alternate database engine.

21. The method of claim 1, wherein said processing further comprises:

identifying data stored by the first database engine that is responsive to the database command; and accessing said identified data, wherein said identifying and accessing are performed exclusively through the command layer of the alternate database engine, without interaction with the command layer of the first database engine.

22. The method of claim 1, wherein the alternate database engine executes only read-only database commands.

23. An apparatus for processing a database command, comprising:

a processor; and a memory in operative communication with the processor, the memory for storing a plurality of processing instructions for directing the processor to:

receive[, from a user,] a database command requiring data from a first database engine, the first database engine having a command layer for processing database commands;

separately process the database command using a command layer of an alternate database engine without accessing the command layer of the first database engine;

evaluate the database command to determine system usage of the database command at the database engine, prior to execution of the database command;

determine a threshold value for system usage of the alternate database engine, wherein the threshold value is based on one or more of: estimated processor usage, estimated memory usage, input/output resource usage and disk resource usage of the alternate database engine;

generate a result of the database command; and transmit the result [to the user submitting the database command].

24. A computer-readable medium encoded with processing instructions [for implementing a method for processing a database command, performed by an alternate database engine, the method] *directing a processor to perform functions, the functions* comprising:

receiving[, from a user,] a database command requiring data from a first database engine, the first database engine having a command layer for processing database commands;

separately processing the database command using a command layer of an alternate database engine without accessing the command layer of the first database engine;

evaluating the database command to determining system usage of the database command at the database engine, prior to execution of the database command;

determining a threshold value for system usage of the alternate database engine, wherein the threshold value is based on one or more of: estimated processor usage, estimated memory usage, input/output resource usage and disk resource usage of the alternate database engine; generating a result of the database command; and transmitting the result [to the user submitting the database command].

25. A method for implementing and using an alternate database engine in conjunction with an established database engine, the method comprising:

providing access to a first database engine to a plurality of users on a computing system, the first database engine having a command layer for processing database commands;

establishing an alternate database engine on the computing system;

receiving a database command from one of the plurality of users, the database command directed to data stored by the first database engine;

separately processing the database command using the alternate database engine without accessing the command layer of the first database engine;

evaluating the database command to determine system usage of the database command at the database engine, prior to execution of the database command;

determining a threshold value for system usage of the alternate database engine, wherein the threshold value is based on one or more of: estimated processor usage, estimated memory usage, input/output resource usage and disk resource usage of the alternate database engine;

generating a result of the database command; and transmitting the result to the user submitting the database command.

26. The method of claim 25, wherein the computer system is one or more of: a local area network, a wide area network, an intranet, an extranet, a wireless network and-/or the Internet.

27. The method of claim 25, wherein the first database engine stores the data in a first database file and the alternate database engine stores data in a second database file.

28. The method of claim 25, wherein the database command is compatible with one or more of: a Structured Query Language format, a Javascript Database Connectivity protocol and an Open-Database Connectivity protocol.

29. The method of claim 25, wherein the database command is a query.

30. The method of claim 29, said evaluating further comprising:

evaluating the query based on one or more of: a parameter of the query, a number of relational databases to be accessed for the query, a size of a data field to be searched for the query, an availability of resources of a system maintaining the alternate database engine, an availability of resources of a system maintaining the first database engine, a number of relational database tables to be employed for the query, a limitation imposed on a size of a query result set, a number of columns of data to be returned in a query result set, a cost of a similar stored query and a number of function calls for the query.

31. The method of claim 29, further comprising:

submitting the query to the alternate database engine with a limit on a number of returns responsive to the query, based on said evaluating.

32. The method of claim 29, further comprising:

editing the query, based on said evaluating.

33. The method of claim 29, further comprising:

rejecting the query, based on said evaluating.

34. The method of claim 29, wherein said evaluating comprises:

determining, prior to said processing, whether the database command requires accessing the data of the first database engine, and if not, accessing only data stored by the alternate database engine.

35. The method of claim 34, said determining further comprising:

translating the query to a native format of the alternate database engine.

36. The method of claim 29, said evaluating further comprising:

determining whether the query requires accessing temporally sensitive data, and if so, accessing a transaction log of the first database engine.

37. The method of claim 25, wherein said transmitting further comprises:

transmitting the result in a format of the first database engine.

38. The method of claim 25, further comprising:

storing second data in a database file maintained by the alternate database engine.

39. The method of claim 38, said processing further comprising:

determining whether the database command requires at least a portion of said second data, and if so, identifying said portion responsive to the database command.

40. The method of claim 25, further comprising:

receiving new data to be provided to the plurality of users; and storing said new data in a database file maintained by the first database engine.

41. The method of claim 25, said processing further comprising:

translating the database command to a native format of the alternate database engine.

42. The method of claim 25, wherein said processing further comprises:

identifying data stored by the first database engine that is responsive to the database command; and accessing said identified data, wherein said identifying and accessing are performed exclusively through a command layer of the alternate database engine, without interaction with the command layer of the first database engine.

43. The method of claim 25, wherein the alternate database engine executes only read-only database commands.

44. An apparatus for implementing and using an alternate database engine in conjunction with an established database engine, comprising:

a processor; and a memory in operative communication with the processor, the memory for storing a plurality of processing instructions directing the processor to:

provide access to a first database engine to a plurality of users on a computing system, the first database engine having a command layer for processing database commands;

establish an alternate database engine on the computing system;

receive a database command from one of the plurality of users, the database command directed to data stored by the first database engine;

separately process the database command using the alternate database engine without accessing the command layer of the first database engine;

evaluate the database command to determine system usage of the database command at the database engine, prior to execution of the database command;

determine a threshold value for system usage of the alternate database engine, wherein the threshold value is based on one or more of: estimated processor usage, estimated memory usage, input/output resource usage and disk resource usage of the alternate database engine; *and* generate a result of the database command; and transmit the result to the user submitting the database command.

45. A computer-readable medium encoded with processing instructions [for performing a method of implementing and using an alternate database engine in conjunction with an established database engine, the method] *directing a processor to perform functions, the functions* comprising:

providing access to a first database engine to a plurality of users on a computing system, the first database engine having a command layer for processing database commands;

establishing an alternate database engine on the computing system;

receiving a database command from one of the plurality of users, the database command directed to data stored by the first database engine;

separately processing the database command using the alternate database engine without accessing the command layer of the first database engine;

evaluating the database command to determine system usage of the database command at the database engine, prior to execution of the database command;

determining a threshold value for system usage of the alternate database engine, wherein the threshold value is based on one or more of: estimated processor usage, estimated memory usage, input/output resource usage and disk resource usage of the alternate database engine; *and* generating a result of the database command; and transmitting the result to the user submitting the database command.

46. A method for processing a database command, performed by an alternate database engine, the method comprising:

receiving, from a user, a database command directed to a first database engine, the first database engine having a command layer for processing database commands;

separately processing the database command using a command layer of the alternate database engine without accessing the command layer of the first database engine, said processing further comprising:

evaluating the database command to determine system usage of the query at the database engine, prior to execution of the database command, said evaluating based on one or more of: a parameter of the query, a number of relational databases for the database command, a size of a data field to be searched for the database command, an availability of resources of the database engine, a number of relational database tables to be employed for the database command, a limitation imposed on a size of a query result set, a number of columns of data to be returned in a query result set, a cost of a similar stored database command and a number of function calls for the database command;

determining a threshold value for system usage of the alternate database engine, wherein the threshold value is based on one or more of: estimated processor usage, estimated memory usage, input/output resource usage and disk resource usage of the alternate database engine;

if the system usage surpasses a threshold value, performing one or more of the following: submitting the database command to the alternate database engine with a limit on a number of returns responsive to the database command, editing the database command, and rejecting the database command;

determining whether the database command requires accessing data maintained by the first database engine, and if not, accessing second data stored only by the alternate database engine;

determining whether the database command requires accessing temporally sensitive data, and if so, accessing a transaction log of the first database engine;

translating the database command to a native format of the alternate database engine; *and* generating a result of the database command; and transmitting the result to the user in a format of the first database engine.

47. The apparatus of claim 23, [further comprising] *wherein the plurality of processing instructions are for further directing the processor to*:

[receiving] *receive* new data to be provided responsive to database commands; and

[storing] *store* said new data in a database file maintained by the alternate database engine.

48. The apparatus of claim 23, [further comprising] *wherein the plurality of processing instructions are for further directing the processor to*:

[receiving] *receive* new data to be provided responsive to database commands; and

[storing] *store* said new data in a database file maintained by the first database engine.

49. The apparatus of claim 23, [said processing further comprising] *wherein the plurality of processing instructions are for further directing the processor to*:

[translating] *translate* the database command to a native format of the alternate database engine.

50. The apparatus of claim 23, wherein [said processing further comprises] *the plurality of processing instructions are for further directing the processor to*:

[identifying] *identify* data stored by the first database engine that is responsive to the database command; and

[accessing] *access* said identified data, wherein said identifying and accessing are performed exclusively through the command layer of the alternate database engine, without interaction with the command layer of the first database engine.

51. The apparatus of claim 23, wherein the alternate database engine executes only read-only database commands.

52. The [method] computer readable medium of claim 24, wherein the database command is a query.

53. The computer readable medium [method] of claim 52, said evaluating further comprising:

evaluating the query based on one or more of: a parameter of the query, a number of relational databases to be accessed for the query, a size of a data field to be searched for the query, an availability of resources of a system maintaining the alternate database engine, an availability of resources of a system maintaining the first database engine, a number of relational database tables to be employed for the query, a limitation imposed on a size of a query result set, a number of columns of data to be returned in a query result set, a cost of a similar stored query and a number of function calls for the query.

54. The computer readable medium [method] of claim 52, further comprising:

submitting the query to the alternate database engine with a limit on a number of returns responsive to the query, based on said evaluating.

55. The computer readable medium of claim 52, [further comprising] *wherein the functions further comprise:* editing the query, based on said evaluating.

56. The computer readable medium of claim 52, [further comprising] *wherein the functions further comprise*:

rejecting the query, based on said evaluating.

57. The computer readable medium of claim 52, wherein said evaluating comprises:

determining, prior to said processing, whether the database command requires accessing the first database engine, and if not, accessing data stored only by the alternate database engine.

58. The computer readable medium of claim 57, said determining further comprising:

translating the query to a native format of the alternate database engine.

59. The computer readable medium of claim 52, said evaluating further comprising:

determining whether the query requires accessing temporally sensitive data, and if so, accessing a transaction log of the first database engine.

60. The computer readable medium of claim 24, wherein said transmitting further comprises:

transmitting the result in a format of the first database engine.

61. The computer readable medium of claim 24, [further comprising] *wherein the functions further comprise*:

storing second data in a database file maintained by the alternate database engine.

62. The computer readable medium of claim 61, [said processing] *wherein the functions* further [comprising] *comprise*:

determining whether the database command requires at least a portion of said second data, and if so, identifying said portion responsive to the database command.

63. The apparatus of claim 44, further comprising:

receiving new data to be provided to the plurality of users; and storing said new data in a database file maintained by the first database engine.

64. The apparatus of claim 44, said processing further comprising:

translating the database command to a native format of the alternate database engine.

65. The apparatus of claim 44, wherein said processing further comprises:

identifying data stored by the first database engine that is responsive to the database command; and accessing said identified data, wherein said identifying and accessing are performed exclusively through a command layer of the alternate database engine, without interaction with the command layer of the first database engine.

66. The apparatus of claim 44, wherein the alternate database engine executes only read-only database commands.

67. The computer readable medium of claim 45, wherein the database command is a query.

68. The [method] computer readable medium of claim 67, wherein said evaluating further comprises:

evaluating the query based on one or more of: a parameter of the query, a number of relational databases to be accessed for the query, a size of a data field to be searched for the query, an availability of resources of a system maintaining the alternate database engine, an availability of resources of a system maintaining the first database engine, a number of relational database tables to be employed for the query, a limitation imposed on a size of a query result set, a number of columns of data to be returned in a query result set, a cost of a similar stored query and a number of function calls for the query.

69. The computer readable medium of claim 67, *wherein the functions* further [comprising] *comprise*:

submitting the query to the alternate database engine with a limit on a number of returns responsive to the query, based on said evaluating.

70. The computer readable medium of claim 67, *wherein the functions* further [comprising] *comprise*:

editing the query, based on said evaluating.

71. The computer readable medium of claim 67, *wherein the functions* further [comprising] *comprise*:

rejecting the query, based on said evaluating.

72. The computer readable medium of claim 67, wherein said evaluating comprises:

determining, prior to said processing, whether the database command requires accessing the first database engine, and if not, accessing data stored only by the alternate database engine.

*73. An apparatus for processing a database command, comprising:*

*a processor; and*

*a memory in operative communication with the processor, the memory for storing a plurality of processing instructions for directing the processor to perform functions, the functions comprising:*

*receiving a database command,*

*separately processing the database command using a command layer of an alternate database engine without accessing a command layer of a first database engine,*

*evaluating the database command to determine system usage of the database command at the alternate database engine, prior to execution of the database command,*

*determining a threshold value for system usage of the alternate database engine, wherein the threshold value is based on one or more of: estimated processor usage, estimated memory usage, input/output resource usage and disk resource usage of the alternate database engine,*

*generating a result of the database command, and*

*transmitting the result of the database command.*

*74. The apparatus of claim 73, wherein the memory further stores a user rights table and wherein the determining the threshold value comprises determining the threshold value based on the user rights table.*

*75. The apparatus of claim 72, wherein generating a result of the database command comprises:*

*comparing the threshold value to the system usage;*

*responsive to the system usage not exceeding the threshold value, submitting the database command to the alternative database engine; and*

*generating a result of the submitted database command at the alternative database engine.*

* * * * *

UNITED STATES PATENT AND TRADEMARK OFFICE

CERTIFICATE OF CORRECTION

PATENT NO. : RE42,808 E
APPLICATION NO. : 12/315061
DATED : October 4, 2011
INVENTOR(S) : Tedesco It is certified that error appears in the above-identified patent and that said Letters Patent is hereby corrected as shown below:

Column 16, line 50, in Claim 26, delete "and-/or" and insert -- and/or --.

Column 22, line 29, in Claim 75, delete "*claim 72*," and insert -- *claim 73*, --.

Signed and Sealed this
Seventeenth Day of April, 2012

David J. Kappos

David J. Kappos
*Director of the United States Patent and Trademark Office*